US012749367B2

(12) United States Patent
Meyer et al.

(10) Patent No.: US 12,749,367 B2
(45) Date of Patent: Sep. 29, 2026

(54) SYSTEMS AND METHODS FOR OVERLAYING GAME INFORMATION

(71) Applicant: Aristocrat Technologies, Inc., Las Vegas, NV (US)

(72) Inventors: Stephen Meyer, Spring Hill, TN (US); Christopher Tisdale, Franklin, TN (US); Cheston Williams, Franklin, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 378 days.

(21) Appl. No.: 18/316,822

(22) Filed: May 12, 2023

(65) Prior Publication Data

US 2024/0221456 A1 Jul. 4, 2024

Related U.S. Application Data

(60) Provisional application No. 63/436,336, filed on Dec. 30, 2022.

(51) Int. Cl.
*G07F 17/32* (2006.01)

(52) U.S. Cl.
CPC ...... *G07F 17/3213* (2013.01); *G07F 17/3227* (2013.01); *G07F 17/3267* (2013.01); *G07F 17/329* (2013.01)

(58) Field of Classification Search
CPC ............. G07F 17/3211; G07F 17/3213; G07F 17/323; G07F 17/3227; G07F 13/3267; G07F 17/329
See application file for complete search history.

(56) References Cited

U.S. PATENT DOCUMENTS

| | | | | |
|---|---|---|---|---|
| 2005/0054423 | A1 | 3/2005 | Wadleigh | |
| 2007/0167216 | A1* | 7/2007 | Walker | G07F 17/3239 463/18 |
| 2007/0232378 | A1 | 10/2007 | Gomez | |
| 2008/0096655 | A1 | 4/2008 | Rasmussen | |
| 2009/0131148 | A1 | 5/2009 | Loose | |
| 2012/0088567 | A1 | 4/2012 | Aoki | |
| 2013/0013992 | A1* | 1/2013 | Jalkanen | G06F 16/9558 715/207 |
| 2013/0079114 | A1* | 3/2013 | Nicely | G07F 17/3244 463/25 |
| 2013/0244777 | A1 | 9/2013 | Barclay | |
| 2014/0256418 | A1* | 9/2014 | Kleppen | G07F 17/3241 463/29 |
| 2018/0322723 | A1 | 11/2018 | Lemay | |
| 2020/0242895 | A1* | 7/2020 | Nelson | G07F 17/3288 |

* cited by examiner

*Primary Examiner* — Robert E Mosser
(74) *Attorney, Agent, or Firm* — Armstrong Teasdale LLP

(57) ABSTRACT

A thin gaming device is provided. The thin gaming device comprises a display, at least one storage medium, an overlay server, and a rendered game overlay module. The overlay server is configured to parse one or more configuration files stored in the at least one storage medium and generate, based on the one or more configuration files, overlay data, the overlay data associated with one or more overlays for a game. The rendered game overlay module is configured to render the overlay data generated by the overlay server and cause to be displayed, on top of a game presentation on the display, the rendering of the overlay data.

19 Claims, 21 Drawing Sheets

SYSTEMS AND METHODS FOR OVERLAYING GAME INFORMATION

CROSS-REFERENCE TO RELATED APPLICATIONS

This application claims the benefit of priority to U.S. Provisional Patent Application No. 63/436,336, filed Dec. 30, 2022, entitled "SYSTEMS AND METHODS FOR OVERLAYING GAME INFORMATION," the entire contents and disclosure of which is hereby incorporated herein by reference.

TECHNICAL FIELD

The field of disclosure relates generally to electronic gaming, and more particularly to a thin gaming device and method for overlaying game information on a thin gaming device.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Bingo games may also be played on electronic gaming machines. In some bingo games, a player receives a bingo card in response to a bingo game wager. A server, possibly after determining that enough players have entered the bingo game, may randomly determine and/or select a set of bingo numbers, and distribute the bingo numbers to the electronic gaming machines in the bingo game. The appropriate cells on the bingo card may be marked (or "daubed") based on the bingo numbers.

Typical games use a random number generator (RNG) to randomly generate elements of the games (e.g., bingo cards, bingo numbers, slot symbol combinations) or to determine the outcome of each game. The game may be designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, a thin gaming device is provided. The thin gaming device comprises a display, at least one storage medium, and overlay server, and a rendered game overlay module. The overlay server is configured to parse one or more configuration files stored in the at least one storage medium and generate, based on the one or more configuration files, overlay data, the overlay data associated with one or more overlays for a game. The rendered game overlay module is configured to render the overlay data generated by the overlay server and cause to be displayed, on top of a game presentation on the display, the rendering of the overlay data.

In another aspect, a method for displaying an overlay on the thin gaming device is provided. The method is implemented by the thin gaming device comprising a display, at least one storage medium, an overlay server, and a rendered game overlay module. The method comprises the overlay server parsing one or more configuration files stored in the at least one storage medium and generating overlay data based on the one or more configuration files, the overlay data associated with one or more overlays for a game. The method further comprises the rendered game overlay module rendering the overlay data generated by the overlay server and causing to be displayed, on top of a game presentation on the display, the rendering of the overlay data.

In another aspect, at least one non-transitory computer-readable storage media having computer-executable instructions embodied thereon is provided. The computer-executable instructions, when executed by at least one processor of a thin gaming device, cause the at least one processor to parse one or more configuration files and generate, based on the one or more configuration files, overlay data, the overlay data associated with one or more overlays for a game. The computer executable instructions further cause the at least one processor to render the overlay data generated by the overlay server and cause to be displayed, on top of a game presentation on the display, the rendering of the overlay data.

BRIEF DESCRIPTION OF THE DRAWINGS

An example embodiment of the subject matter disclosed will now be described with reference to the accompanying drawings.

DETAILED DESCRIPTION

Figure 1:
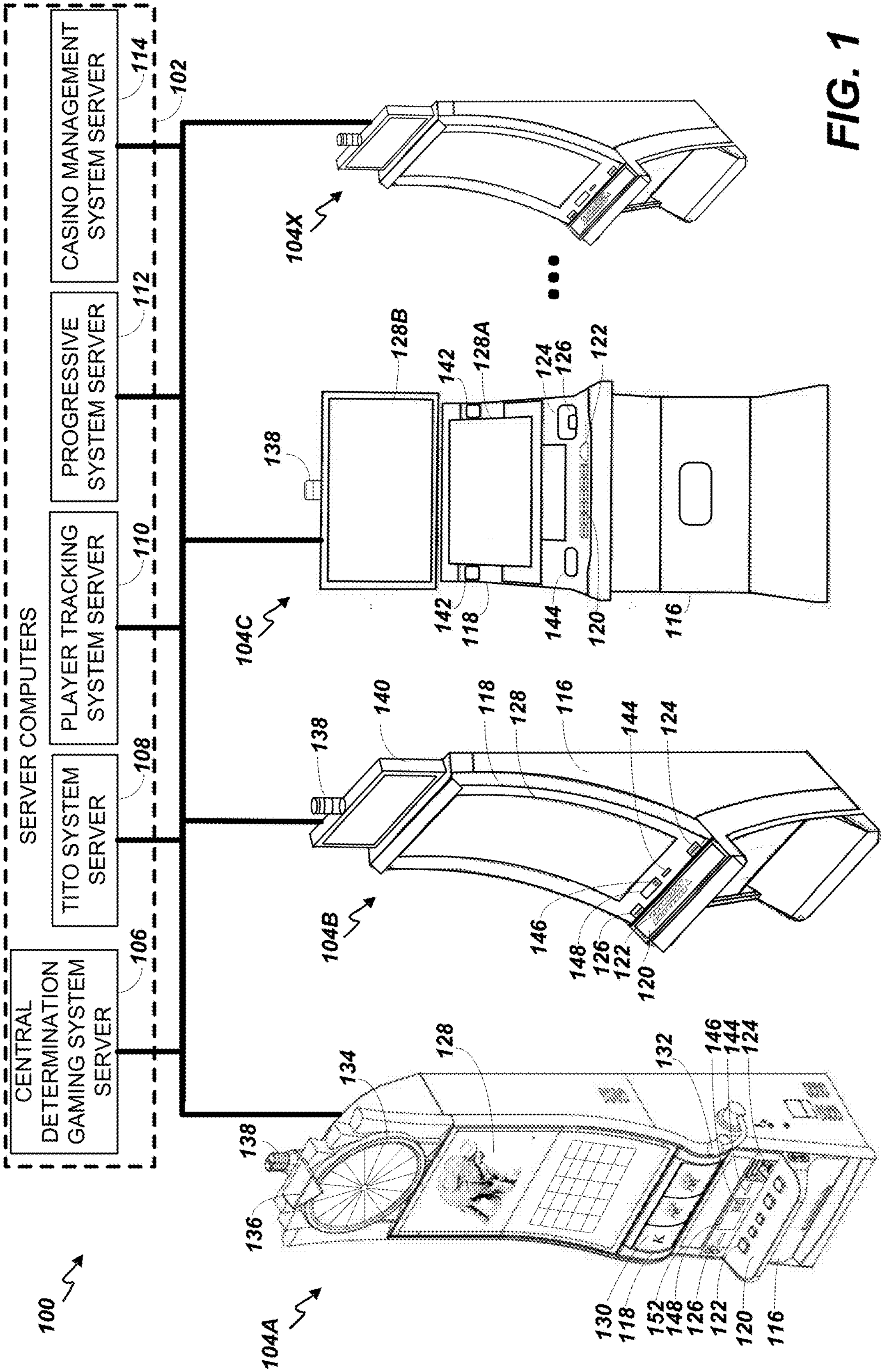
FIG. 1 is an exemplary diagram showing several EGMs networked with various gaming related servers.

A thin gaming device and method for overlaying game information on a thin gaming device are described herein. As commonly used, a thin client computer device is one that operates using resources housed inside a central server as opposed to resources that are stored, e.g., on a hard drive of the device. This same description is applicable to the thin gaming device described herein. The thin gaming device setup described herein more closely mimics the way games are played and displayed on legacy games (e.g., non-thin or thick gaming devices) and is capable of displaying game information (e.g., a bingo card and a ball call) independent from the game itself. The thin gaming device described herein includes one or more of a platform module, a game module, a rendered game overlay module, an overlay server and at least one storage medium. One or more configuration files are stored on the at least one storage medium. During initialization (e.g., setup) of the thin gaming device, the platform module transmits a configuration message to the overlay server, the configuration message specifying a location of one or more configuration files. The platform module maps the configuration file to the overlay server so that the overlay server can directly read the configuration file from the storage medium. The overlay server parses the configuration file and generates, based on the configuration file, overlay content and transmits the overlay data to the rendered game overlay module. The rendered game overlay module, which runs a web browser or application which is presented on top of a game presentation, renders the overlay data.

At least one technical effect or technical improvement that is achieved by the systems and associated methods described herein include at least one of: (i) increasing variability for game presentation to users; (ii) improving a user interface by displaying certain information to a user when having a limited amount of available display area for displaying information; (iii) lowering game machine cost by reducing the computational requirements of the gaming machine; (iv) increasing variability of the games that a gaming machine may execute by enabling a gaming machine to be compatible with a variety of different wagering games; (v) enabling a game machine to switch games more easily by removing the need to reprogram the game machine; (vi) improving the flexibility of the gaming device by separating the styling information from the game code; (vii) improving system configuration by providing a rendered game overlay module and an overlay server that enables the web browser or application to be overlaid on a game display device of a thin client device so that additional data may be displayed on a simple device; and (viii) more closely replicating a game experience provided by a legacy gaming device on a thin gaming device by enabling changes to the location and timing of overlays displayed on the thin gaming device.

In some embodiments, the central gaming server may be further configured for communication with one or more legacy Class II gaming devices (e.g., gaming devices that do perform the Class II game evaluation locally) in addition to the non-legacy, thin client devices described herein. The ball call may be further stored on behalf of the legacy gaming devices (i.e., a single ball call is performed for both the thin gaming devices and legacy gaming devices), and may be transmitted to the legacy gaming devices, which may evaluate the ball call with respect to a bingo card and pay table locally. Accordingly, the communal gameplay may include both legacy gaming devices and thin gaming devices.

As a matter of background, many Class II game systems conduct wagering games based on a bingo game or a bingo-like game. Class II bingo-like games may include pull-tab games, lotteries, punch boards, tip jars, and instant bingo, among others. In some bingo-based wagering games, a game system provides a bingo card to a player in exchange for a wager. The bingo card may be generated at random and may be evaluated against a randomly drawn ball call. The evaluation determines whether the player wins and, if so, determines a payout. Class III games include traditional non-bingo-based casino games, such as, for example, slot machines, blackjack, roulette, and craps, among others.

Legacy Class II bingo-like games may connect to a central server that, for example, generates a random ball call that is shared with other participating legacy Class II games via networked communication to provide a multiplayer game experience, in which Class II game results may be determined by legacy gaming devices based on the random ball call received from the central server. Class III games typically include a random number generator (RNG) that can generate its own game results and, in some instances, may operate independently with respect to game resolution for individual game instances. As such, Class III games may be referred to as non-centrally-determined games.

As used herein, the terms "primary game," "main game," and "base game" may refer to games initiated in response to one of a plurality of game initiation events, such as a wager or credit being received by or transferred to an EGM, as described herein. A primary game may be associated with a primary game outcome represented by a plurality of primary game symbols or primary game reels, each of which may include a plurality of primary game symbols, and each of which may be selected based upon a random number generated by a random number generator (e.g., in Class III games) or based on an evaluation of a bingo card and ball call (e.g., in Class II games).

Further, as used herein, the terms "secondary game," "feature game," and "bonus game" may refer generally to a game or a component of a game involving procedures in addition to the primary game. In some embodiments, a bonus game may be triggered from a primary game and may be associated with a bonus game outcome, which may be different from the primary game outcome. For example, a bonus game may be initiated after, or during, a primary game and in response to the occurrence of a particular condition, such as a "trigger condition" occurring during the primary game. A bonus game may result in a bonus game outcome or bonus award that increases a primary game award or adds a bonus game award to a primary game award.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
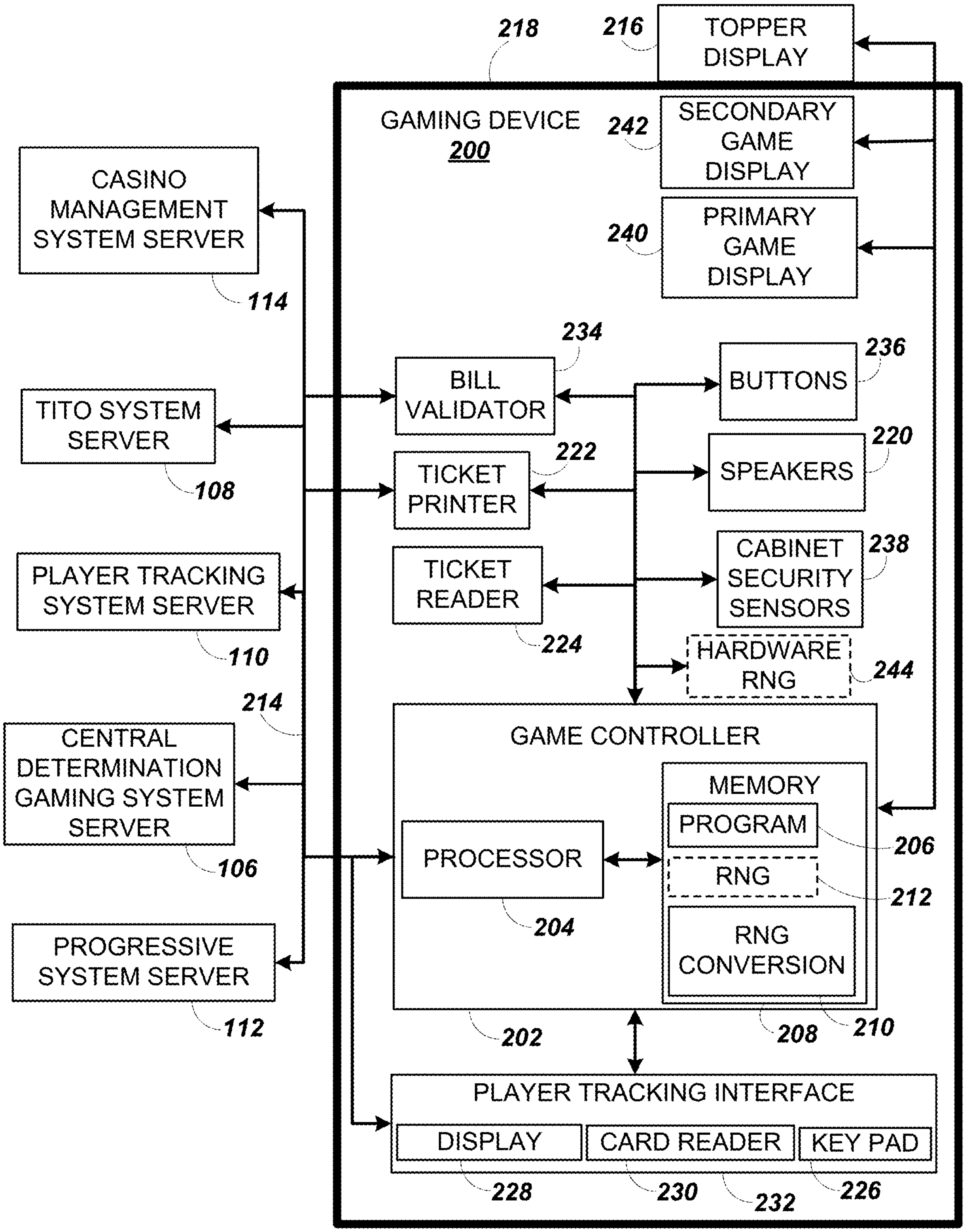
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Figure 4:
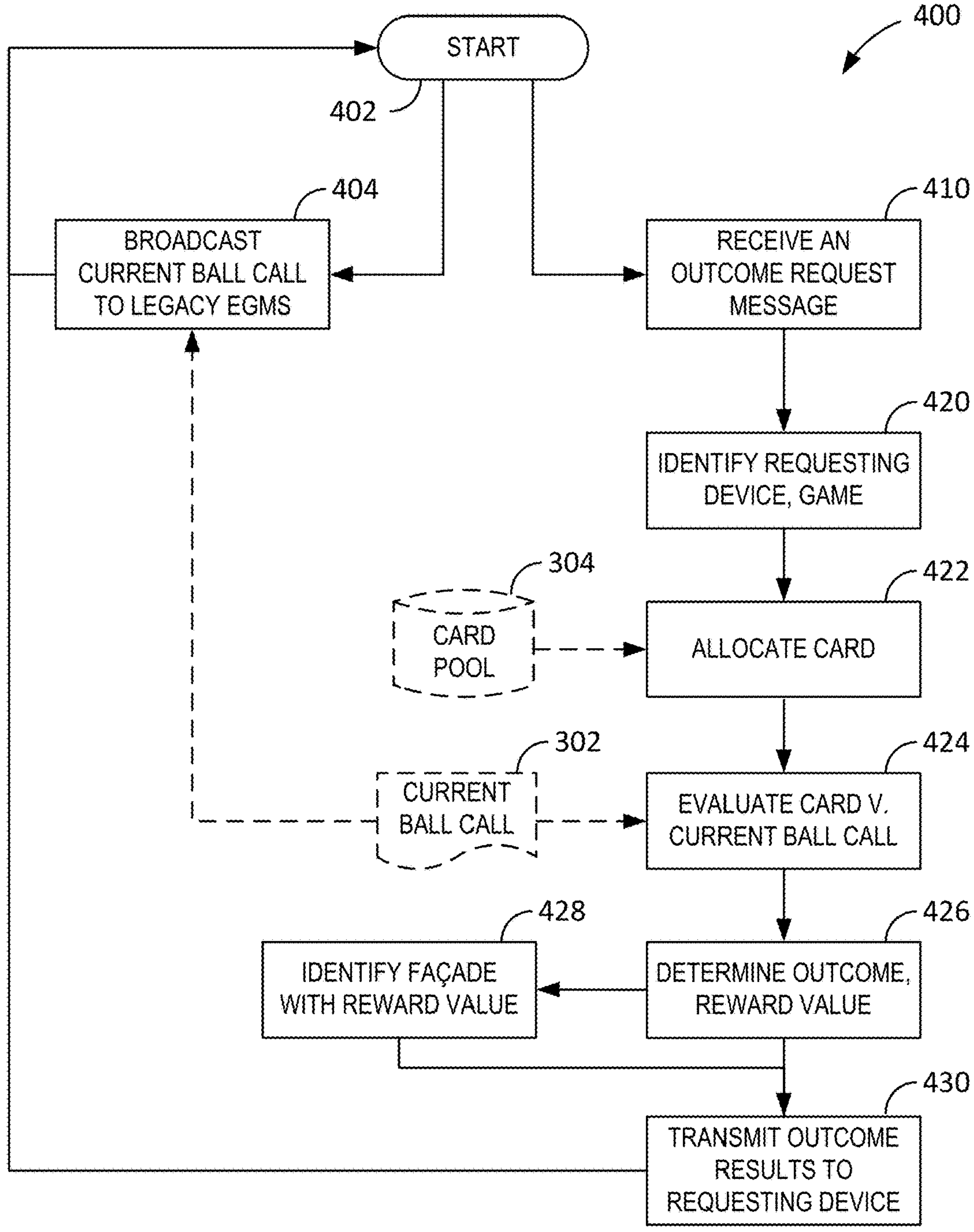
FIG. 4 is flowchart illustrating an example method for providing a communal bingo game to both legacy EGMs and thin gaming devices in accordance with various embodiments described herein.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106. For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
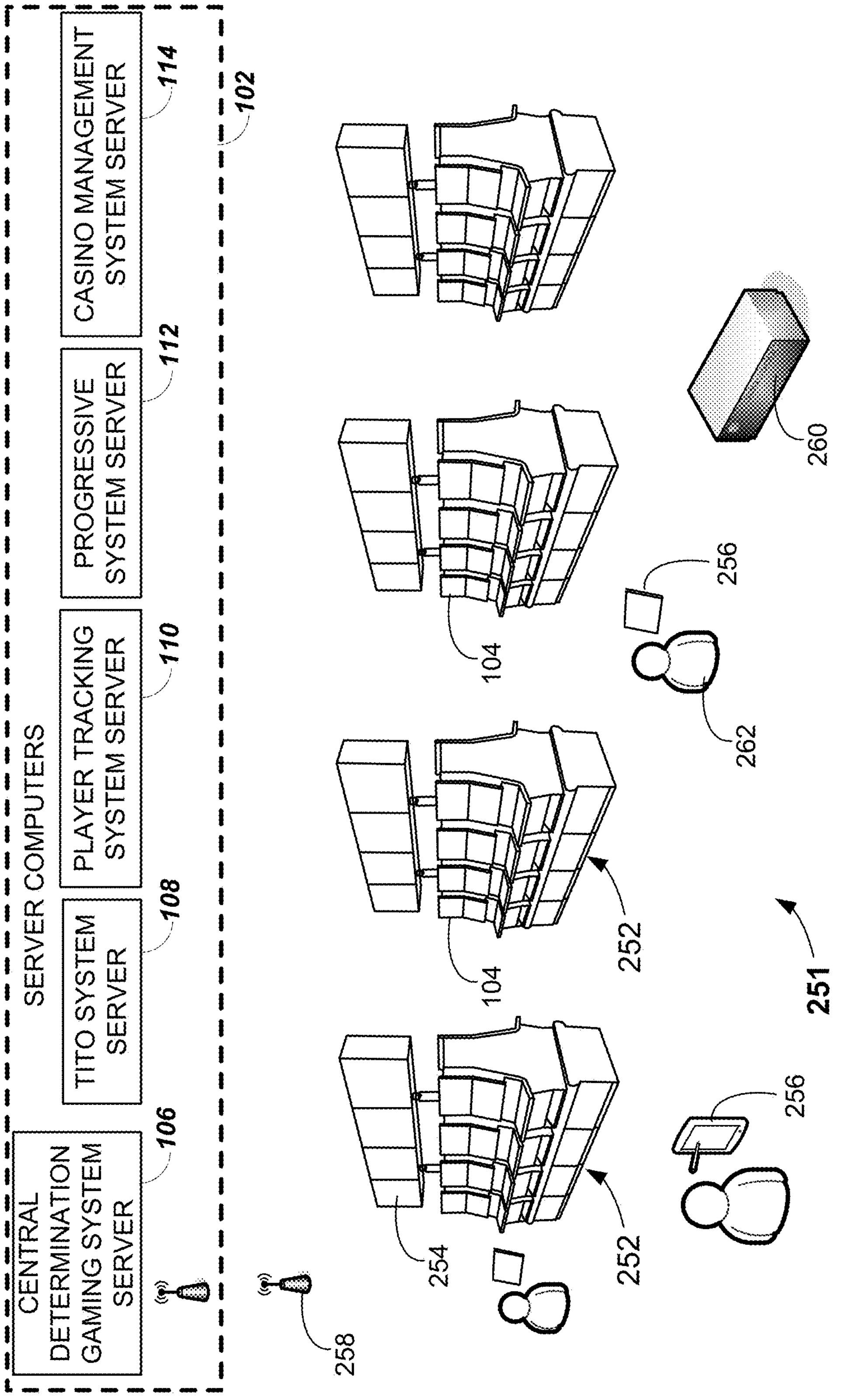
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
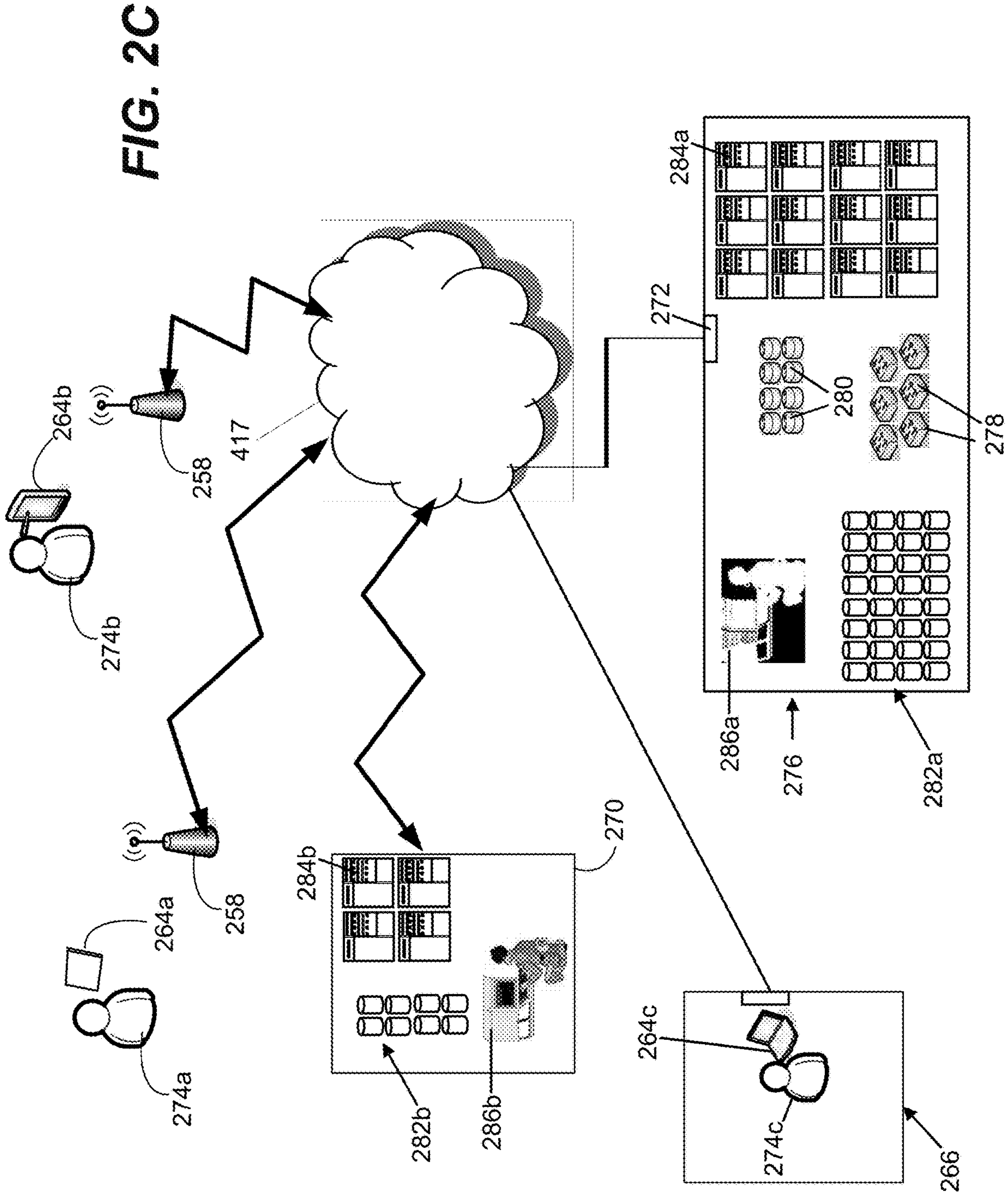
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types, and arrangements of gaming devices shown in FIG. 2C are merely shown by way of example. In this example, various gaming devices, including but not limited to end user devices (EUDs) 264_a_, 264_b_ and 264_c_ are capable of communication via one or more networks 417. The networks 417 may, for example, include one or more cellular telephone networks, the Internet, etc. In this example, the EUDs 264_a_ and 264_b_ are mobile devices: according to this example the EUD 264_a_ is a tablet device and the EUD 264_b_ is a smart phone. In this implementation, the EUD 264_c_ is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282_a_, servers 284_a_ and one or more workstations 286_b_. The servers 284_a_ may, for example, be configured to provide access to a library of games for online game play. In some examples, code for executing at least some of the games may initially be stored on one or more of the storage devices 282_a_. The code may be subsequently loaded onto a server 284_a_ after selection by a player via an EUD and communication of that selection from the EUD via the networks 417. The server 284_a_ onto which code for the selected game has been loaded may provide the game according to selections made by a player and indicated via the player's EUD. In other examples, code for executing at least some of the games may initially be stored on one or more of the servers 284_a_. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284_b_, storage devices 282_b_, and one or more workstations 286_b_. According to this example, the financial institution data center 270 is configured to maintain financial accounts, such as checking accounts, savings accounts, loan accounts, etc. In some implementations one or more of the authorized users 274_a_-274_c_ may maintain at least one financial account with the financial institution that is serviced via the financial institution data center 270.

According to some implementations, the gaming data center 276 may be configured to provide online wagering games in which money may be won or lost. According to some such implementations, one or more of the servers 284_a_ may be configured to monitor player credit balances, which may be expressed in game credits, in currency units, or in any other appropriate manner. In some implementations, the server(s) 284_a_ may be configured to obtain financial credits from and/or provide financial credits to one or more financial institutions, according to a player's "cash in" selections, wagering game results and a player's "cash out" instructions. According to some such implementations, the server(s) 284_a_ may be configured to electronically credit or debit the account of a player that is maintained by a financial institution, e.g., an account that is maintained via the financial institution data center 270. The server(s) 284_a_ may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274_a_-274_c_), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
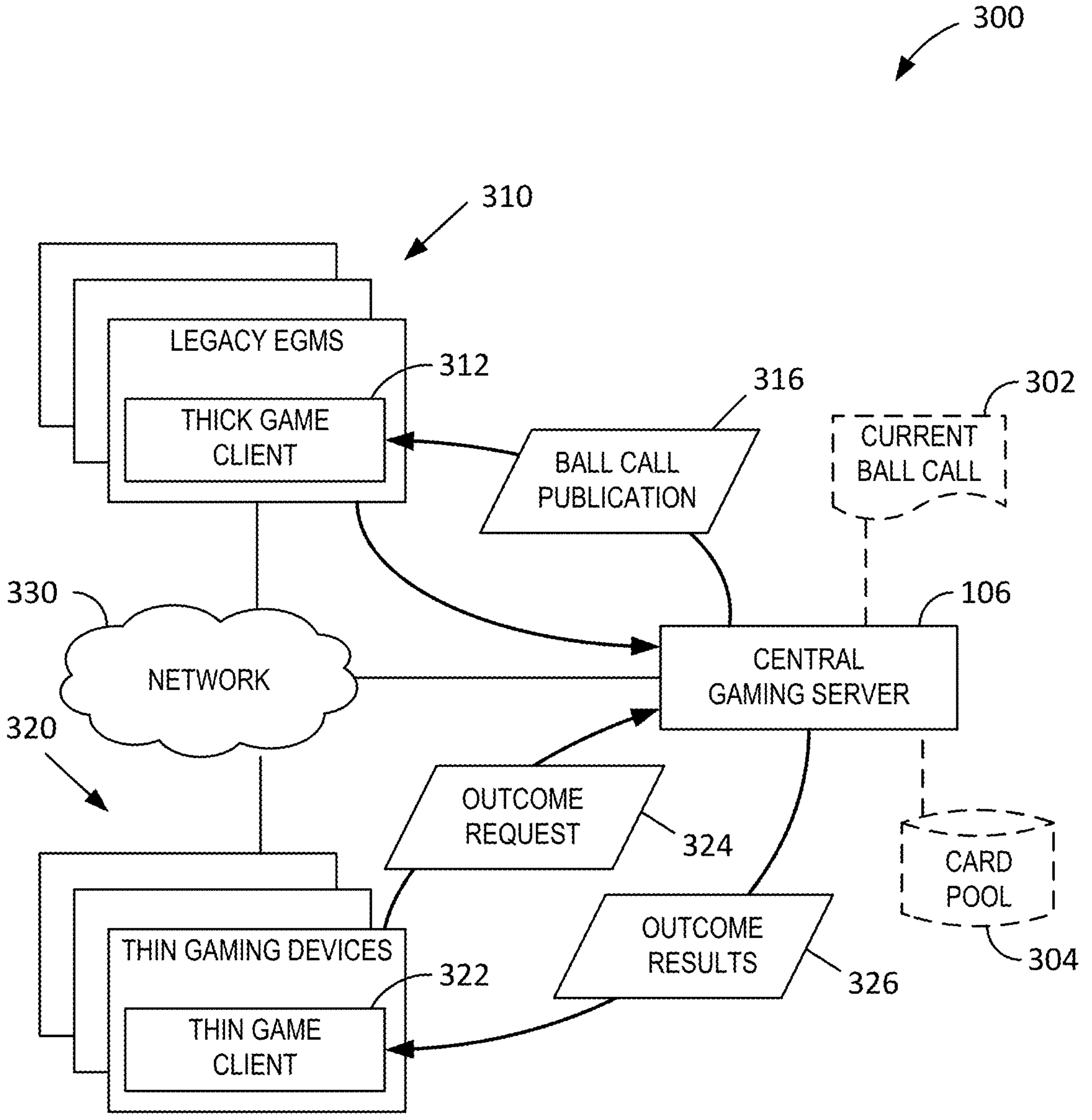
FIG. 3 network diagram illustrating components and data flow of a centrally-determined gaming system in accordance with various embodiments described herein.

FIG. 3 is a network diagram illustrating components and data flow of a centrally-determined gaming system 300. In the example embodiment, the central determination gaming system server (or just "central gaming server") 106 supports class II bingo-like games for both legacy gaming devices ("thick gaming devices," or just "legacy EGMs") 310 and for thin gaming devices 320. In some embodiments, legacy EGMs 310 may be similar to the gaming devices 104, 200 shown in FIGS. 1A and 2A, and thin gaming devices 320 may be similar to gaming devices 104, 200 shown in FIGS. 1A and 2A, mobile gaming devices 256 shown in FIG. 2B, or EUDs 264 (shown in FIG. 2C). In the example embodiment, the legacy EGMs 310 and thin gaming devices 320 communicate with the central gaming server 106 via one or more networks 330, such as network 214, the Internet, local wireless networks, or the like.

In the example embodiment, the central gaming server 106 generates and manages a centralized ball call 302 for Class II bingo-like games executing on the legacy EGMs 310 and the thin gaming devices 320. More specifically, the central gaming server 106 is configured to provide the centralized ball call 302 for various legacy Class II gaming devices, such as the legacy EGMs 310. A given round of bingo for the central gaming server 106 typically uses a set of 75 to 140 balls, 40 of which are selected at random to begin the round (e.g., via RNG) and additional balls may be selected at random at a predetermined interval (e.g., one new ball every 1.6 seconds, or the like). The round of bingo ends when a predetermined maximum number of balls have been selected or when any participating gaming device achieves a game ending win (e.g., a cover all or some other predetermined pattern or condition).

The legacy EGMs 310 provide games that participate in a shared game through use of the shared, centralized ball call 302. For example, legacy EGMs 310 may receive or generate a pool of bingo cards (sometimes referred to herein as "local bingo cards") that may be used to resolve individual game instances (e.g., individual wager games). When a player submits a wager for a particular game instance, the legacy EGM 310 assigns one of the bingo cards to that game instance and compares that bingo card to the centralized ball call 302, managed and provided by the central gaming server in a ball call publication 316, to determine a wager; for that game instance (e.g., a win amount). The legacy EGM 310 may then use the win amount to select a display façade that reflects that particular win amount in a simulated game (e.g., a spinning reel game, keno, poker, or the like). For example, if the game instance results in a 500-credit win, the legacy EGM 310 identifies a display façade that shows, for example, a reel spin outcome resulting in a 500-credit win (e.g., based on payline evaluation, ways evaluation, or the like, of the selected spin outcome). With such legacy EGMs 310, the central gaming server 106 provides the ball call 302, but the legacy EGMs 310 perform game resolution processing. The games executing on these legacy gaming devices are referred to herein as "thick game clients" 312.

In the example embodiment, the gaming system 300 also provides gaming devices that participate in Class II bingo-like games (e.g., the shared ball call 302), but which shift some aspects of game processing to the central gaming server 106. These gaming devices are referred to herein as "thin gaming devices" 320 executing "thin game clients" 322. With thin gaming devices 320, the central gaming server 106 not only provides the shared ball call 302 that is used for game resolution, but additionally performs game instance processing steps for each game instance (e.g., card generation, card selection, instance evaluation, bonus features, progressives, and perhaps façade selection). For example, when a player submits a wager for a particular game instance, the thin gaming device 320 transmits an outcome request message 324 to the central gaming server 106. The outcome request message 324 may include a gaming device identifier (ID), a player ID (e.g., loyalty ID, online account ID, mobile device ID, or the like), a game ID (e.g., identifying what wagering game the instance is associated with), a wager amount, and a synchronized timestamp taken at the time of wager placement. In some embodiments, the outcome request message 324 may include a theme ID (e.g., used to identify the game theme being played), a variation (e.g., used to identify the variation/pay table being wagered against), a denomination (e.g., of the wager currency), an outcome quantity (e.g., the number of results requested), a transaction ID (e.g., used to uniquely identify the message, such as in the event of a message drop or resend), or a wager category (e.g., additional information associated with the wager).

Upon receipt of the outcome request message 324, the central gaming server 106 conducts a game evaluation for that game instance. During game instance processing, the central gaming server 106 generates or selects a bingo card for that game instance. The card for each game instance may, for example, be randomly generated for that particular game instance or may be selected from a pool (e.g., card pool 304) of pre-generated cards awaiting allocation. Once a card for the game instance has been identified, the central gaming server 106 evaluates the card against the ball call 302 to determine a win amount for this particular game instance. In some embodiments, the current state of the ball call 302 may be used to evaluate the card, where in other embodiments the state of the ball call 302 at the time of the timestamp of this game instance may be used. Evaluating the card against the ball call 302 may include applying the ball call 302 to the card (e.g., daubing each of the called balls) and comparing the daubed card to a set of predetermined winning conditions (e.g., winning patterns) defined in a pay table for the particular game, bingo round, or such.

The following is a portion of an example XML-formatted pay table file for a Class II wagering game that may be used by the central gaming server to evaluate game instances on behalf of the thin gaming devices 320:

```
<Paytables>
  <Paytable baseBet="68" betMultiplier="2" minCredits="136">
    <MatchingPatterns>
      ...
      <MatchingPattern ID="1451" BallQty="40" Payout="7560"
      Index="14">
      </MatchingPattern>
      ...
    </MatchingPatterns>
  </Paytable>
</Paytables>
<Bingo>
  <Mode>Column</Mode>
  <EvaluationType>HighestPriorityPaid</EvaluationType>
  <Patterns Version="1.0.0.0">
    <Pattern ID="1451">
      <Name>Pattern # 1451</Name>
      <Width>5</Width>
      <Height>5</Height>
      <PatternMap>1110011110112110111110111</PatternMap>
    </Pattern>
    ...
  </Patterns>
</Bingo>
```

The example pay table file includes a <Paytables> element and a <Bingo> element. The <Paytables> element defines one or more <Paytable> elements, each corresponding to a possible credit wager combination. Within each <Paytable>, a <MatchingPatterns> element contains multiple <MatchingPattern> elements, one for each bingo win pattern applicable to this particular wager combination. Each <MatchingPattern> includes an ID (identifying a pattern ID for this pattern), a BallQty (identifying a number of balls under which this pattern is considered a winning pattern), a Payout (identifying a win amount for this pattern), and an Index (a unique index number for this <MatchingPattern> within <MatchingPatterns>). In the example embodiment, the ID is used to cross-reference one or more <Pattern>'s provided within the <Bingo> element, as described below.

The <Patterns> element of <Bingo>, in the example embodiment, defines the set of patterns used by the particular wagering game. More specifically, each individual pattern has a <Pattern> element defining a unique ID (e.g., "1451") as well as several sub-elements (e.g., Name, Width, Height, and PatternMap). <Name> defines a name or moniker for the pattern (e.g., "Four Corners", "Corporal Stripes", or, in this example, just "Pattern #1451"). <Width> and <Height> define the dimensions of the bingo card (e.g., 5 by 5). <PatternMap> (or "pattern map") includes an ordered sequence of characters (e.g., numbers 0, 1, or 2) that defines the winning pattern. Each of the characters of the pattern map corresponds to a cell of a bingo card (e.g., bingo card), where "0" indicates that the corresponding cell is not daubed, "1" indicates that the corresponding cell is daubed, and "2" indicates the center cell (which is always considered daubed, and thus may be excluded from illustrations of winning patterns). In this example, the pattern map is "1110011110112110111110111", and the pattern map is interpreted in a column-incrementing approach, as defined by "<Mode>Column</Mode>" (e.g., starting from top-left, traversing each column left to right, then moving down a row, and so forth).

One or more main bingo game outcomes may be determined by the central gaming server 106 for each outcome request message 324 based on comparisons between the ball call 302 and the numbered cells of the selected bingo card. The central gaming server 106 may determine if the selected card contains any winning bingo combinations based on comparisons between the ball call 302 and the numbered cells of the card. A winning bingo pattern may include a particular predefined pattern of bingo card cells (e.g., particular cells of selected card) having numbers that match numbers in the ball call 302 and within a predefined quantity of numbers called (e.g., within the first 10, 20, 30, 40, etc. numbers called in the ball call 302). Further, each main bingo game may have one or more game ending winning bingo patterns and/or one or more interim winning bingo patterns. A game ending winning bingo pattern may comprise a particular bingo pattern associated with a game ending main bingo game winning outcome that ends the main bingo game (e.g., all cells of the selected card having numbers that match numbers in the bingo list of numbers). An interim winning bingo pattern may comprise one or more other interim winning bingo patterns associated with one or more interim main bingo game winning outcomes. Interim winning bingo patterns and/or interim main bingo game winning outcomes may occur during the main bingo game without ending the main bingo game (e.g., without resetting and restarting the ball call 302). A new listing of bingo numbers may be generated after a game ending main bingo game winning outcome occurs, thereby causing the central gaming server 106 to initiate another (new) main bingo game.

In some examples, interim winning bingo patterns may include traditional bingo patterns such as, for example, a completed horizontal cell row of the bingo card, a completed vertical cell column of the bingo card, a completed diagonal cell row of the bingo card, four cell corners of the bingo card, and/or all the cells of the bingo card. In an exemplary embodiment, interim winning bingo patterns may comprise less traditional patterns such as, for example, a particular pattern that may be easily recognized by a player, or a seemingly randomly generated subset of cells disposed in no easily discernible arrangement. A winning main bingo game outcome may be determined for the player if there are one or more interim or game ending winning bingo patterns on the main bingo card. Further, different winning patterns may be associated with different rewards of the winning main bingo game outcome. In some examples, the reward for a winning main bingo game outcome may be based on an amount wagered ("game wager"), a main bingo game pay table, a set of rules for the main bingo game, a probability of achieving a particular bingo pattern, an amount (e.g., a maximum number) of bingo numbers needed to achieve the particular bingo pattern, or other considerations. Rewards associated with main bingo game winning outcomes or winning bingo patterns may be outlined in the pay table. The main bingo game outcome may be a losing outcome for a player if that player does not achieve any winning patterns.

Once the central gaming server 106 has determined an award outcome for that particular game instance, the central gaming server 106 transmits an outcome results message 326 back to the requesting thin gaming device 320. In the example embodiment, the outcome results message 326 includes the determined reward value for that game instance (e.g., a number of credits greater than or equal to zero), data defining the selected card for that instance (e.g., a 5×5 matrix of numbers appearing on that selected card), and the current ball call 302 used to determine the reward value. In some embodiments, the ball call 302 may continue to be streamed to and received by the gaming devices 310, 320 while not actively wagering (e.g., until the next wager is placed, until the current bingo game round ends with a game ending win, or such). In at least some embodiments, central gaming server 106 assigns pay tables to thin gaming devices 320. Therefore, different pay tables could be used at different thin gaming devices 320, which may result in different RTP at the different thin gaming devices 320. Thus, central gaming server 106 may dynamically set the RTP at the different gaming devices.

Upon receiving the outcome results 326, the thin gaming device 320 displays the selected card, the ball call 302, and a façade matching the reward value, as well as credits the meter on the thin gaming device 320 with that reward value. More specifically, in the example embodiment, the main bingo game outcome(s) may be simulated to the player on the thin gaming device 320 in a spinning reel game façade with one or more reel game outcomes. The winning or losing main bingo game outcomes may be presented to the players via the reel game, which may simulate one or more reel game outcomes equal to the appropriate main bingo game outcome. For example, if the main bingo game outcome for the game instance is a losing outcome, the reel game provided as a façade by the thin game client 322 for that thin gaming device 320 may simulate one or more similarly losing reel game outcomes. If the main bingo game outcome for the game instance is a winning outcome, the thin game client 322 may simulate one or more reel game winning outcomes. In an exemplary embodiment, the reward for the one or more simulated winning reel game outcomes will be less than or equal to the reward for the main bingo game outcome for a particular gaming machine. In some examples, the available reel simulations may not provide for all possible main bingo game winning outcomes, so a main reel game outcome may be shown with a lesser reward. In such an example, the player may still receive the full reward for the main bingo game winning outcome, with the reward being presented as a combination of a credit reward for the displayed main reel game outcome, plus 'poof' credits. For example, if a player received a main bingo game winning outcome associated with a 17-credit reward, the player might receive a main reel game winning outcome associated with a 15-credit reward, and an additional 2 "poof" credits may also be added to the player's credit meter.

In some examples, the thin game client 322 may simulate the reel game by spinning each reel and then stopping each reel in a particular position to obtain a matrix of symbols. One or more combinations of symbols in the matrix of symbols may be associated with a reel game outcome that is equal to the main bingo game outcome. If the main bingo game outcome is a winning outcome, then the thin game client 322 may spin the reels to obtain a matrix of symbols having one or more combinations of symbols associated with a reel game winning outcome. If the main bingo game outcome is a losing outcome, then the thin game client 322 may spin the reels to obtain a matrix of symbols that is associated with a reel game losing outcome (e.g., having no combinations of symbols associated with a reel game winning outcome). If the symbol matrix has one or more combinations of symbols associated with a reel game winning outcome, those symbols may be highlighted, emphasized, and/or otherwise indicated. If the player obtains a main bingo game winning outcome, the thin game client 322 may provide the main bingo game reward (and/or award, payout, prize, etc.) in the form of a spinning reel game reward that corresponds to the winning symbol combination(s) presented in the reel game. In some examples, rewards for each winning symbol combination may be set forth in an associated reel game pay table. If the player obtains a losing bingo outcome, then the reel game outcome will be a losing outcome, and no winning reel game symbol combinations will be presented in the reel game symbol matrix.

In the example embodiment, the thin game client 322 selects a façade from a local database of preconstructed façades based on the reward value for that game instance. Each of the façades in the façade list has a predefined value associated with that façade outcome, and each predefined value may include multiple façades for a given value. For example, the thin game client 322 may store a façade list that includes many losing game outcomes (e.g., reel spin results that yield zero credit awards), several 100 credit outcomes, 150 credit outcomes, 200 credit outcomes, and so forth, for a wide variety of credit outcomes. As such, in the example embodiment, when the thin game client 322 receives an outcome result 326 for a particular game instance (e.g., a reward value), the thin game client 322 may select one of the available outcomes that matches or nearly matches the determined reward value provided in the outcome results 326 from a table of façades. The thin game client 322 may, for example, identify all façades with a stored reward value equal to or just lower than the achieved reward value and may select one of those façades for presentation to the player (e.g., based on an RNG outcome). In another embodiment, the central gaming server 106 may perform the façade determination (e.g., with an RNG output and selection from the table of façades) and may provide a façade ID in the outcome results 326 for use by the thin game client 322 (e.g., sending an index value of the determined façade to the thin game client 322, which can be used to look up the façade in a locally stored table on the thin game client 322). Once a façade for this game instance has been determined, the thin game client 322 displays the selected façade on the thin gaming device 320, along with the selected card and ball call.

In some examples, special symbols may be added to the matrix of symbols of the spinning reel game. In some examples, the special symbols may comprise one or more feature symbols, such as coins, for example. In some examples, the special symbols may comprise one or more wild (and/or wild card) symbols. In various examples, the awarded special symbols may or may not contribute to a winning combination of symbols. In some examples, whether and/or what special symbols are added to the spinning reel game may be based on the outcome of the main bingo game, and/or any main bingo game winning patterns. In some examples, the main bingo game pay table may include one or more special symbol flags associated with one or more main bingo game winning patterns to indicate whether (and/or which) special symbols should be added to the spinning reel game simulation.

In some examples, one or more of the participating gaming machines may provide a second (e.g., feature) bingo game to a player. For example, the feature bingo game may be part of (or all of) the main bingo game reward (and/or corresponding simulated reel game reward) for a particular gaming machine. In exemplary examples, the main bingo game pay table may include one or more feature game flags associated with one or more main bingo game winning patterns to indicate whether a feature game should be included as part of the reward. In exemplary examples, the feature bingo game is presented to a player as a reward for a reel game symbol matrix having a certain number of special feature symbols. For example, the player may obtain a winning bingo outcome with a winning bingo pattern that is associated with a credit reward and a feature game flag in the main bingo pay table. The winning bingo outcome may be subsequently presented in the reel game simulation as a reel game symbol matrix having a certain number of feature symbols (e.g., three or more coin symbols) that correspond to a feature game reward, as well as one or more symbol combinations that correspond to the bingo game credit reward.

The feature bingo game may be partially associated with the main bingo game. For example, the feature bingo game may include a feature bingo game card (not shown), but may use the main bingo game ball call number list. The feature bingo card may have a grid of numbered cells that are different from the grid of numbered cells on the main bingo card. In some examples, the feature bingo game may use the original main bingo game card and a different (i.e., second) set of bingo game numbers. The feature bingo game may be associated with a feature pay table that is different from the main pay table associated with the main bingo game. Thus, bingo patterns that might result in a main bingo game winning outcome may result in a feature bingo game losing outcome, and/or vice versa. Further, the rewards for winning outcomes in the feature bingo game may be different than in the main bingo game.

As with the main bingo game, one or more feature bingo game outcomes may be determined by the central gaming server 106 or by the thin game client 322 (e.g., to match or approximately match the reward value for this game instance, to provide an additional feature game, or the like). The one or more feature bingo game outcomes may be based on comparisons between the ball call 302 and the numbered cells of the main bingo card, or on a feature bingo card (e.g., an additional card selected for this game instance). The one or more feature bingo game outcomes may be simulated in a feature reel game façade with one or more feature reel game outcomes. In an exemplary embodiment, the cumulative rewards for the one or more feature reel game outcomes on a particular gaming machine will be less than or equal to the reward for the feature bingo game outcome for that particular gaming machine. In some examples, the available reel simulations may not provide for all possible feature bingo game winning outcomes, so a feature reel game outcome may be shown with a lesser reward. In such an example, the player may still receive the full reward for the feature bingo game winning outcome, with the reward being presented as a combination of a credit reward for the displayed feature reel game outcome, plus 'poof' credits.

In some examples, a gaming machine may prompt a player to make a selection (e.g., a volatility selection) before proceeding with the feature bingo game. The selection may be related to several volatility options for the feature bingo game and/or feature reel games. For example, the player may be prompted to select between several different combinations of free spins and/or wild symbols, which may be implemented during the associated feature reel game simulation. The volatility options may range from a few free spins with a large number of wild symbols to a large number of free spins with few wild symbols. A feature bingo game pay table may be dynamically generated using the selected volatility option, or it may be chosen from a set of predetermined feature bingo game pay tables, in accordance with the selected volatility option. A feature game may be triggered by outcome results 326 of the base game instance and may result in the thin game client 322 providing an outcome request message 324 for the feature game, and similar processing by the central gaming server 106. After a feature bingo game outcome is determined using the feature bingo game pay table, the central gaming server 106 may similarly provide an outcome results message 326 for the feature game, and the thin game client 322 may similarly simulate the feature bingo game outcome through a feature reel game. The feature reel game may apply a number of free spins and/or wild symbols corresponding to the selected volatility option. The feature reel game may produce a number of reel game outcomes equal to the selected number of free spins (e.g., one outcome for each free spin). The selected number of wild symbols may equal the number of wild symbols displayed in the spinning reels during the feature reel game simulation.

In exemplary examples, the total reward for all of the feature reel game outcomes accumulated during the free spins may be less than or equal to the reward for the feature bingo game. As with the main bingo game, rewards for a winning feature bingo game outcome may be based on an amount initially wagered (e.g., bingo game wager), a probability of achieving a particular bingo pattern, a feature bingo game pay table, an associated set of rules for the feature bingo game, an amount of bingo numbers needed to achieve the particular bingo pattern, or other considerations. Rewards associated with feature bingo game winning outcomes (and/or winning bingo patterns) may be outlined in the feature bingo game pay table. The feature bingo game pay table may be different from the main bingo game pay table, and may be dynamically generated based on the player's volatility selection (e.g., selected number of free spins and/or wild card symbols).

All rewards achieved in the game instance, in the main bingo game and in any triggered feature games may include a credit payout associated with a monetary value. A credit tally may be updated on the thin gaming device 320 based on that credit payout. In some examples, the reward may come in the form of a payout that increases a credit balance and/or credit meter of the player on the thin gaming device, in an account of the player, or the like.

As such, the gaming system 300 offloads aspects of game processing and computation for the thin gaming devices 320. This disposition of game processing steps provides numerous technological benefits. For example, since the thin gaming devices 320 no longer need to perform much of the processing for each game instance, focusing primarily on input/output (I/O) associated with the game, the thin gaming devices require less computational hardware. This reduced hardware requirement allows additional devices to participate in the centralized game, such as mobile devices, tablets, or thin Bartop EGMs 104. Further, centralization of the outcome logic onto the central gaming server 106 provides security benefits, in that the thin gaming devices 320 are no longer responsible for determining game outcomes. As such, the thin game client 322 may require less storage and less memory to execute, and the security of the thin game client 322 may be less restrictive since the thin game client 322 no longer determines game outcomes.

Further, in the example embodiment, the central gaming server 106 may be configured to concurrently support both legacy EGMs 310 as well as thin gaming devices 320 in the same centralized game. For example, the central gaming server 106 may provide a ball call 302 that is concurrently shared amongst both the legacy EGMs 310 and the thin gaming devices 320. More specifically, for thick game clients 312 on the legacy EGMs 310, the central gaming server 106 may provide an application programming interface (API) through which the thick game clients 312 can submit ball call requests for the current ball call 302, or the thick game clients 312 may receive a broadcast of the current ball call 302 in a ball call publication 316 to the legacy EGMs (e.g., via regular UDP broadcast). Simultaneously, for the thin gaming devices 320, the central gaming server 106 may provide another API or API call through which the thin game clients 322 can submit outcome request messages 324 with each game instance, submit ball call requests for the current ball call 302, or receive a broadcast of the current ball call 302 in a ball call publication 316 to the thin game clients (e.g., included in outcome results 326 or via UDP broadcast similar to ball call publication 316). In each of these cases, the same ball call 302 may be provided to both the legacy EGMs 310 and to the thin gaming devices 320, thereby allowing cross-device-type participation in the same communal game, such as, for example, thin client games and legacy games competing to claim a game ending win. Such cross-device-type participation may additionally help facilitate certain regulatory aspects of class II games, which often require multiple players to be actively participating in the communal game.

Further, by performing a server-side evaluation for thin gaming devices 320, central gaming device may be able to support a significantly greater number of gaming devices for a single bingo game. For example, while existing server systems may support about 100 legacy EGMs, central gaming server 106 may support communal gameplay among 800 or more connected thin gaming devices 320. This greater capacity may help facilitate certain regulatory aspects of class II games requiring multiple players to be actively participating in the communal game, may reduce undesirable delays in gameplay resulting from a fewer number of active players, and may enhance gameplay experience in that in at least some implementations, a greater number of players engaged in communal gameplay may result in potentially greater reward values.

Additionally, such support of thin client devices allows various façade games and types of games to be supported by the backend bingo-like ball call and outcome processing. For example, since the central game server 106 primarily provides an outcome evaluation as a distilled result (e.g., in the form of a reward value), the thin game client can provide many different types of façade games along with associated façades for various reward values, such as keno, blackjack, poker, scratch offs, lottery, or the like. This system 300 therefore allows multiple different types of games to participate in the same backend ball call 302.

FIG. 4 is a flowchart illustrating an example method 400 for providing a communal bingo game to both legacy EGMs 310 and thin gaming devices 320. In the example embodiment, the method 400 is performed by the central gaming server 106 while in networked communication with legacy EGMs 310 and thin gaming devices 320. The method 400 starts 402 by broadcasting a current ball call to participating EGMs (e.g., to legacy EGMs 310). Upon starting a new round of bingo, the central gaming server 106 manages the round of bingo by regularly publishing (e.g., broadcasting) the current ball call 302 to participating devices at operation 404. Such broadcasting 404 is regularly performed as new balls are called during the game round.

To support thin gaming devices 320, the method 400 also includes receiving an outcome request message from a thin gaming device 320 at operation 410. Upon receipt of the outcome request message, the method 400 includes performing an outcome evaluation for the game instance. More specifically, in the example embodiment, the central gaming server 106 identifies the requesting device and game at operation 420. At operation 422, the central gaming server 106 allocates a card to this game instance from the card pool 304. In some embodiments, the central gaming server 106 may be hosting multiple communal games and, as such, may use the device ID or game ID of the requesting device 310, 320 to determine what card pool 304 to use for the card allocation or for identifying the current ball call 302 in which the requesting device 310, 320 or game are participating. At operation 424, the central gaming server 106 evaluates the allocated card using the current ball call 302 for this communal game. As described above, evaluation of the allocated card may utilize a particular pay table for this communal game, which may likewise be identified based on device ID or game ID of the requesting device 320.

In the example embodiment, at operation 426, the central gaming server 106 determines an outcome of the game instance based on the evaluation of the card against the current ball call. This outcome includes a reward value (e.g., based on the pay table of the game associated with the game instance). In some embodiments, at operation 428, the central gaming server 106 may also identify a façade for the game instance based on the reward value (e.g., a façade that approximately yields the reward value in the façade game). In other embodiments, operation 428 may be performed by the thin game client 322 after receiving the reward value in the outcome results 326. At operation 430, the central game server 106 transmits outcome results 326 to the requesting device (e.g., to the thin gaming device 320). Such outcome results 326 may include the reward value, the game card allocated to this game instance, and the current ball call 302 used to evaluate the card. After completing the transmission of the outcome results 326, the method 400 returns to the start 402 for further processing.

Figure 5:
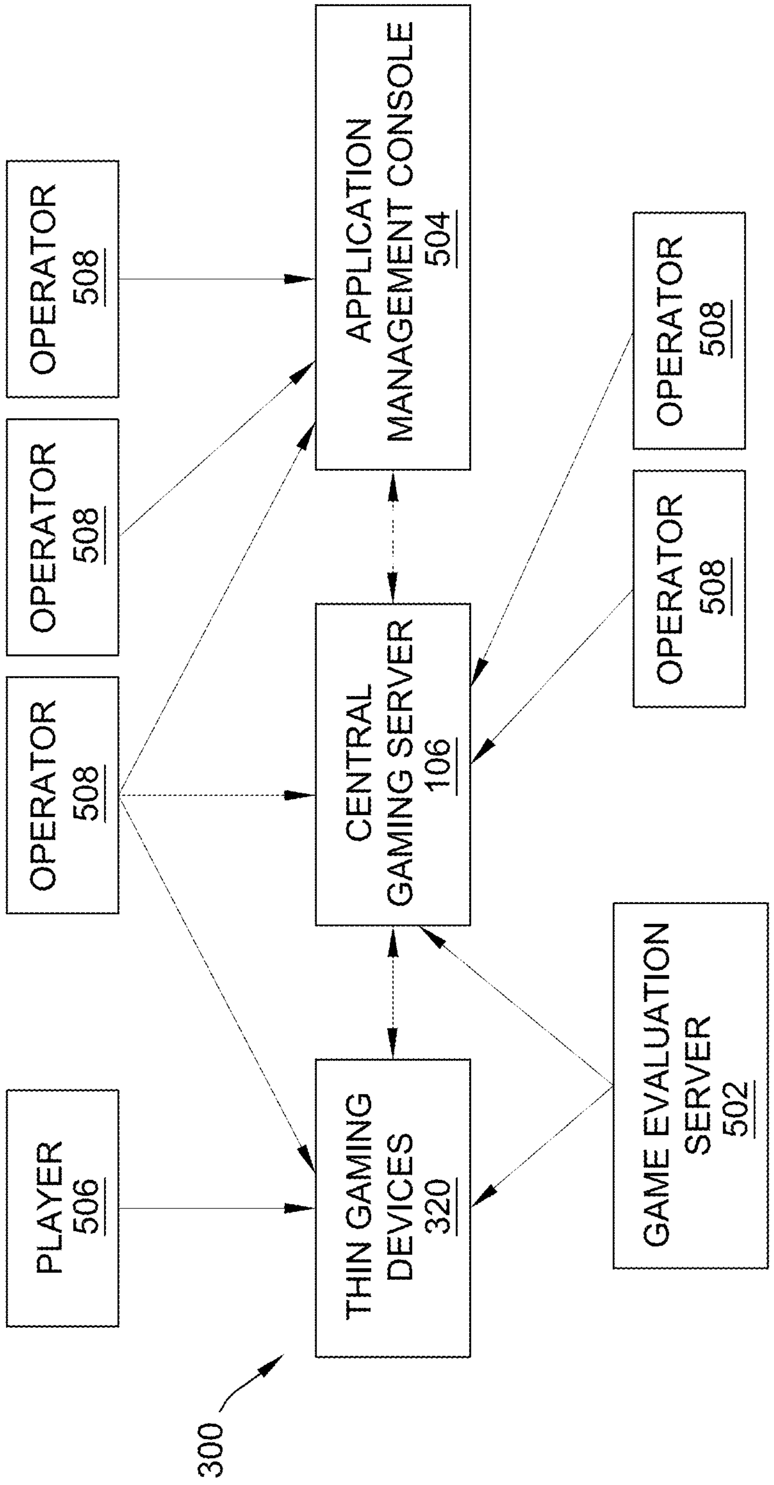
FIG. 5 is a block diagram illustrating an example embodiment of the gaming system shown in FIG. 3.

FIG. 5 is a block diagram illustrating an example embodiment of gaming system 300 shown in FIG. 3. Gaming system 300 may include a game evaluation server 502 coupled in communication with central gaming server 106 and/or thin gaming devices 320 (both shown in FIG. 3), and an application management console 504 coupled in communication with central gaming server 106.

When a player 506 accesses gameplay using thin gaming device 320, game evaluation server 502 may perform at least some of the server-side game evaluation functions described with respect to central gaming server 106, and in some embodiments may be integrated into central gaming server 106. For example, game evaluation server 502 may determine one or more bingo game outcomes for each outcome request message 324 received from thin gaming device 320 based on comparisons between the ball call 302 and numbered cells of a selected bingo card and determine if the selected card contains any winning bingo combinations based on comparisons between the ball call 302 and the numbered cells of the card. As described in further detail below, the ball call 302 may be generated within gaming system 300 (e.g., by central gaming server 106), or may be received externally (e.g., from a wide area ball caller).

Application management console 504 may be configured to display a user interface, through which one or more operators 508 may configure, control, and/or monitor EGMs (e.g., thin gaming devices 320) connected to central gaming server 106 and to generate and provide reports, which may be used for, for example, accounting, compliance reporting, data analytics, and/or maintenance.

Figure 6:
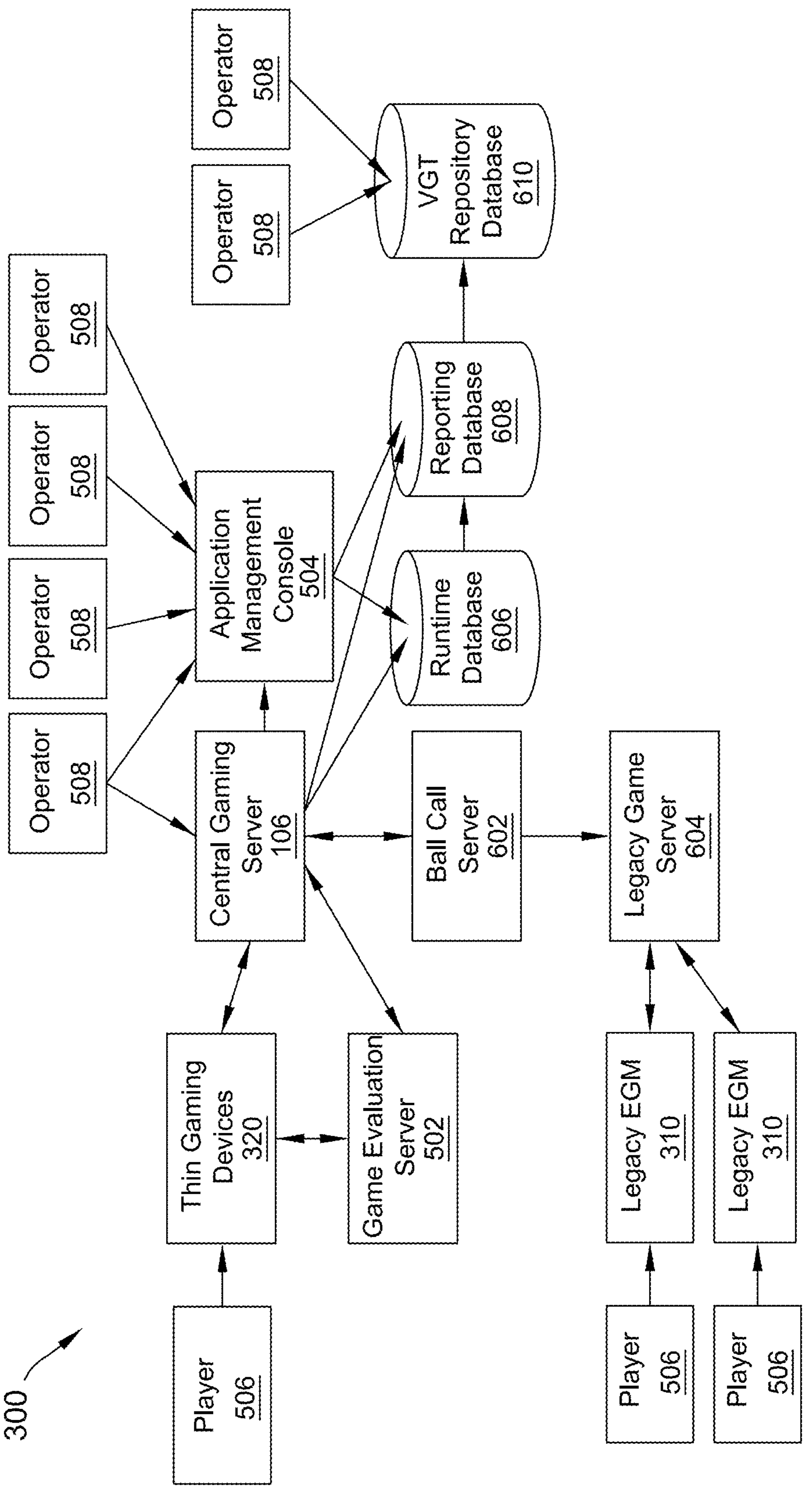
FIG. 6 is a block diagram illustrating another example embodiment of the gaming system shown in FIGS. 3 and 5.

FIG. 6 is a block diagram illustrating another example embodiment of gaming system 300 shown in FIG. 3, in which gaming system 300 includes, and may provide a communal bingo game to, both legacy EGMs 310 and thin gaming devices 320. Gaming system 300 may include a ball call server 602 configured to generate ball call 302, which may be used by game evaluation server 502 to evaluate respective bingo cards for thin gaming devices 320, and by legacy EGMs 310 to evaluate their respective bingo cards locally. Gaming system 300 may further include a legacy game server 604, through which legacy EGMs 310 may receive ball calls 302 from ball call server 602 and report wins to central gaming server 106. In some embodiments, legacy game server 604 may perform any necessary protocol translation, so that existing legacy EGMs 310 may be integrated into gaming system 300 (e.g., by being enabled to communicate with central gaming server 106) without a need for reconfiguring and/or updating legacy EGMs 310.

Gaming system 300 may further include a runtime database 606 and a reporting database 608 both coupled in communication with central gaming server 106 and/or application management console 504. Runtime database 606 may be configured to store runtime data associated with operation of central gaming server 106 and other components of gaming system 300. Reporting database 608 may be configured to store reporting data for use by operators 508. This reporting data may be accessed by operators 508 through application management console 504 and/or used to update (e.g., periodically) a repository database 610.

Figure 7:
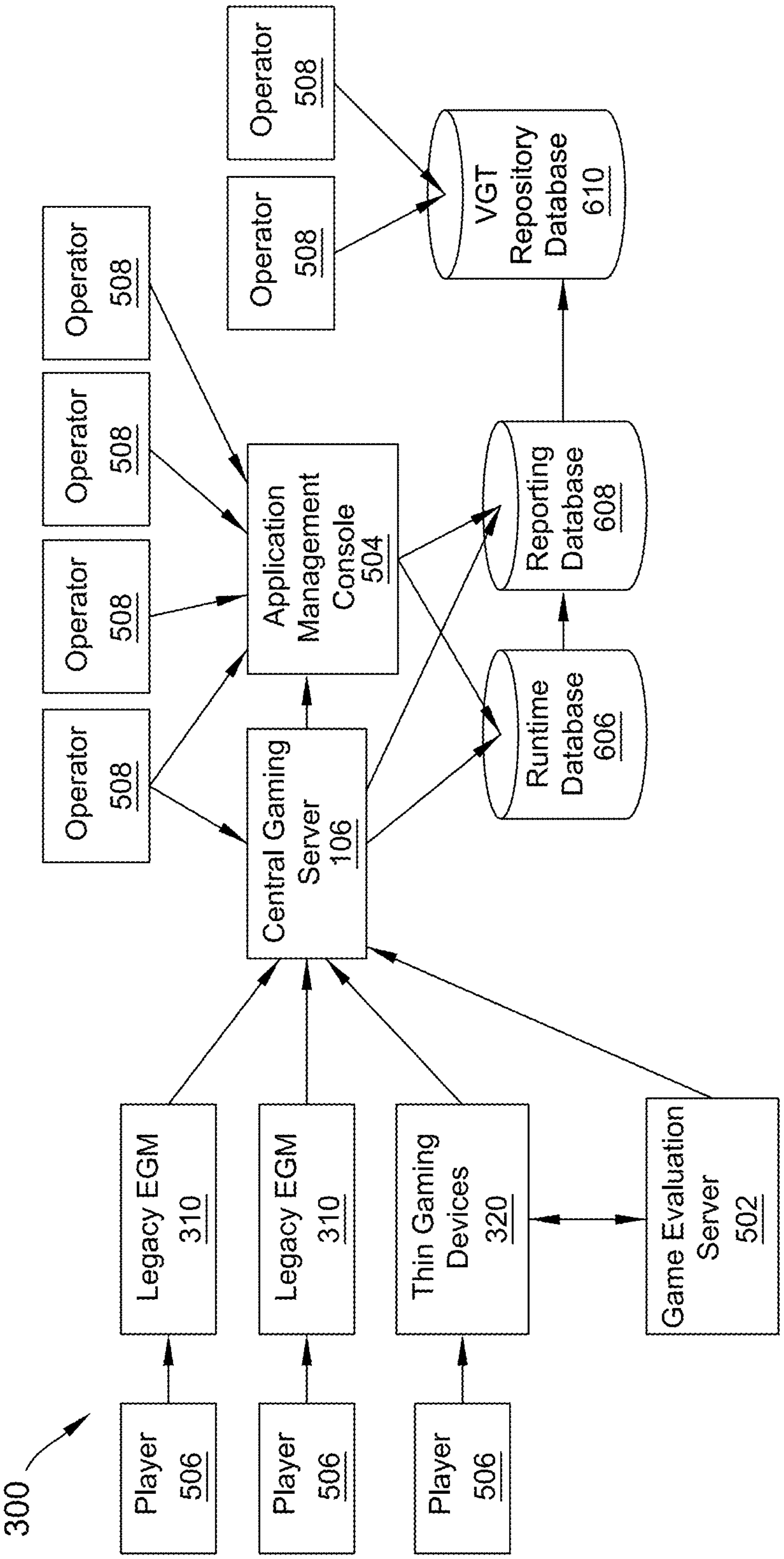
FIG. 7 is a block diagram illustrating another example embodiment of the gaming system shown in FIGS. 3, 5, and 6.

FIG. 7 is a block diagram illustrating another example embodiment of gaming system 300 shown in FIG. 3, in which central gaming server 106 is configured to communicate directly with legacy EGMs 310. Central gaming server may be configured to communicate (e.g., transmit ball calls to and receive win reporting from) with legacy EGMs 310 using legacy communication protocols, so that existing legacy EGMs 310 may be integrated into gaming system 300 (e.g., by being enabled to communicate with central gaming server 106) without a need for reconfiguring and/or updating legacy EGMs 310. Legacy EGMs 310 and thin gaming devices 320 may be respectively coupled to central gaming server 106 through separate ports and/or APIs, so that central gaming server may identify a coupled device as a legacy EGM 310 and/or a thin gaming device 320, and determine how to communicate with each device using appropriate data and/or protocols for each device. For example, legacy EGMs 310 may receive only ball calls from central gaming server 106 and report wins (e.g., game ending wins) to central gaming server 106, while thin gaming devices, as described above with respect to FIG. 3, may receive game outcomes, facade data, and/or other configuration data from central gaming server 106 and report claimed wins (e.g., game ending wins) to central gaming server 106.

Figure 8:
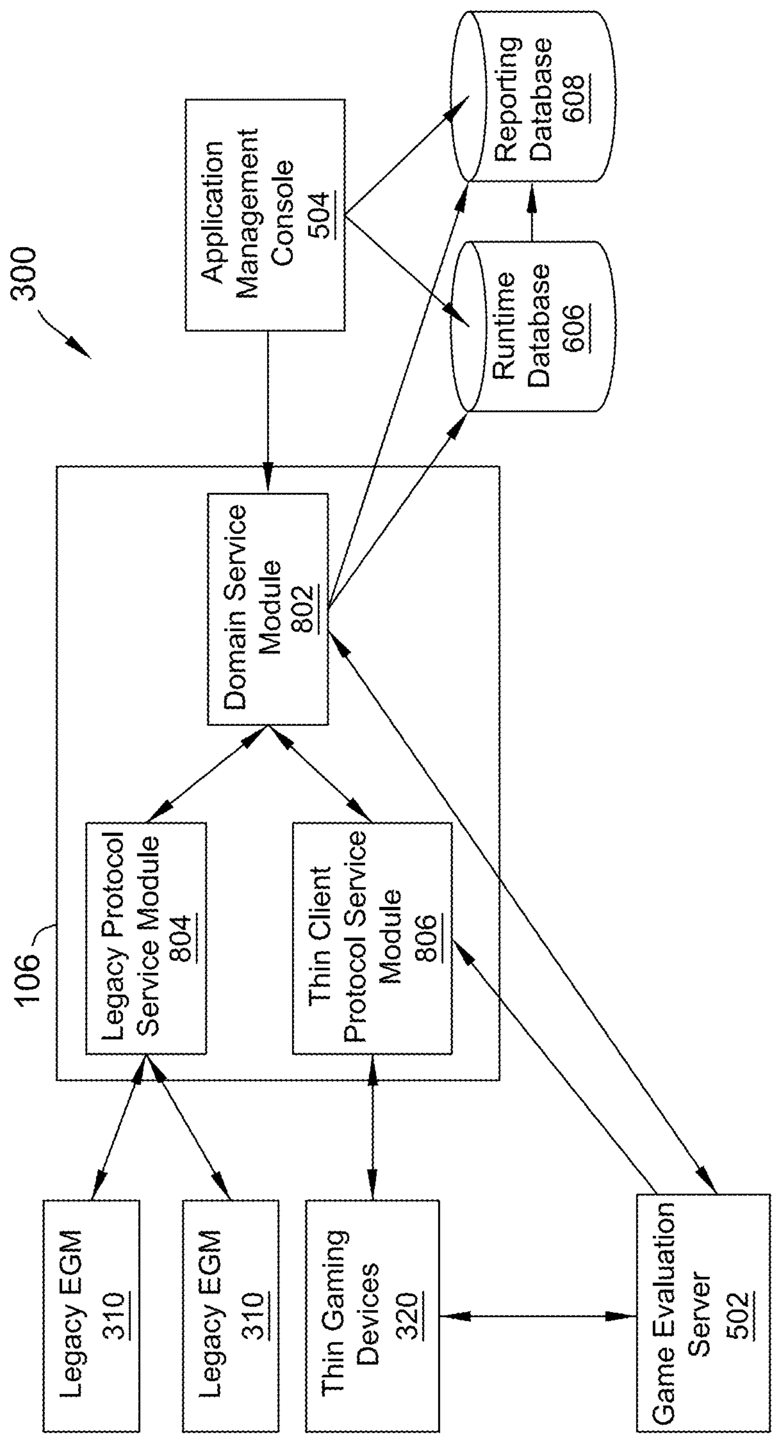
FIG. 8 is a block diagram illustrating another example embodiment of the gaming system shown in FIGS. 3, 5, 6, and 7.

FIG. 8 is a block diagram illustrating another example embodiment of gaming system 300 shown in FIG. 3, illustrating additional detail of central gaming server 106. Central gaming server 106 may include a domain service module 802, a legacy protocol service module 804, and/or a thin client protocol service module 806, which each may be implemented using dedicated software, hardware, or any combination thereof. Domain service module 802 may be configured to execute services required for gameplay (e.g., generic gameplay and/or specific types of gameplay) for server side games such as bingo (as described with respect to FIG. 3). Legacy protocol service module 804 may be configured to translate between legacy protocols used by legacy EGMs 310 and game server protocols used by domain service module 802, and to provide an API (sometimes referred to herein as a "legacy API") through which legacy EGMs 310 may communicate with central gaming server 106. Similarly, thin client protocol service module 806 may be configured to translate between legacy protocols used by thin gaming devices 320 and game server protocols used by domain service module 802, and to provide an API (sometimes referred to herein as a "thin client API") through which thin gaming devices 320 may communicate with central gaming server 106.

Figure 9:
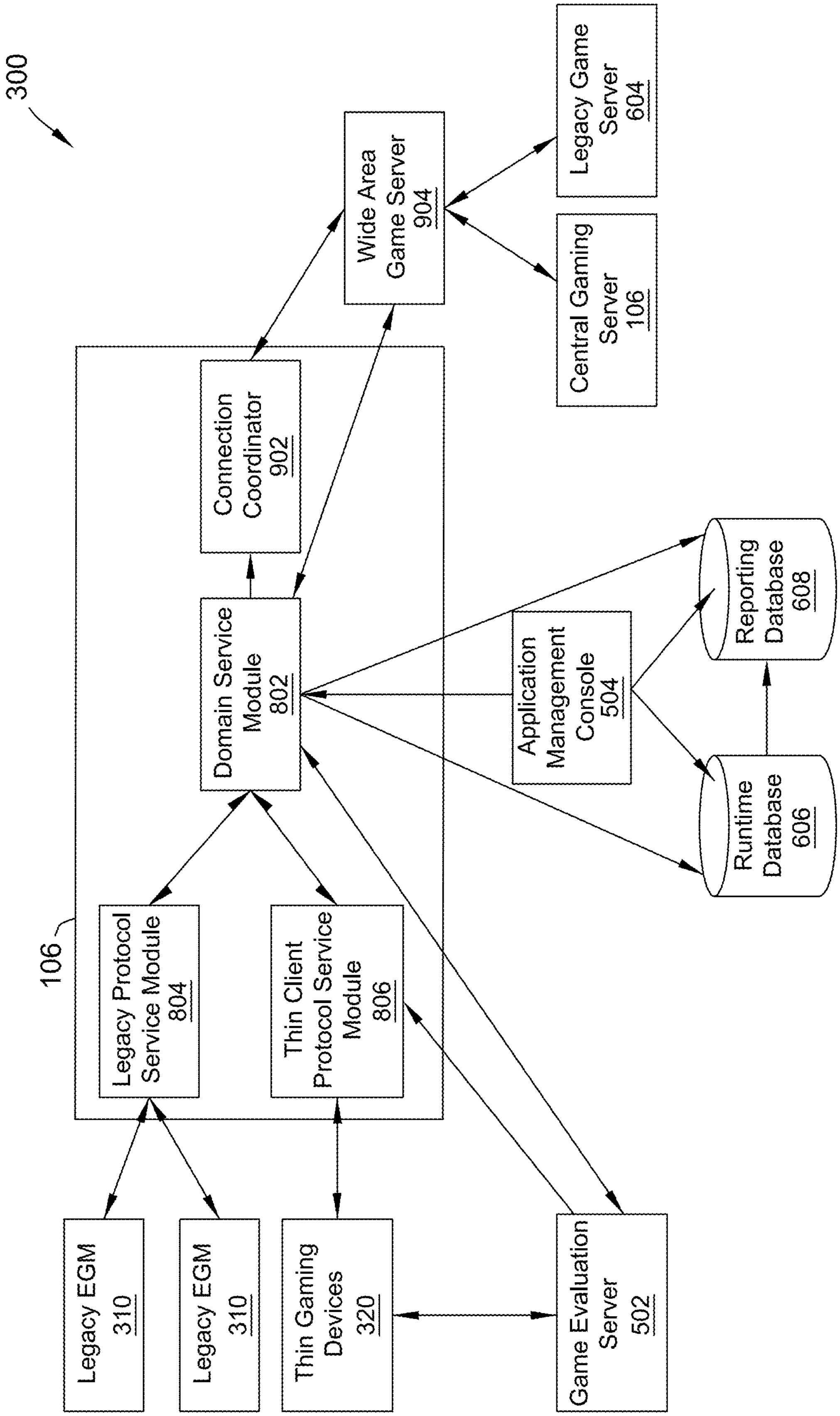
FIG. 9 is a block diagram illustrating another example embodiment of the gaming system shown in FIGS. 3, 5, 6, 7, and 8.

FIG. 9 is a block diagram illustrating another example embodiment of gaming system 300 shown in FIG. 3, in which gaming system 300 further includes a connection coordinator 902 coupled in communication with domain service module 802 and a wide area game server 904 coupled in communication with connection coordinator 902. Wide area game server may further be coupled in communication with one or more additional central gaming servers 106 and/or legacy game servers 604. Wide area game server 904 may facilitate communal gameplay between multiple central gaming servers 106 and/or legacy game servers 604, such as, for example, separate central gaming servers 106 and/or legacy game servers 604 located at a given site, central gaming servers 106 and/or legacy game servers 604 located at different (e.g., remote) sites, and/or some combination thereof. Wide area game server 904 may be configured to generate and provide a common ball call 302 to each central gaming servers 106 and/or legacy game servers 604, and determine a game ending win (as described with respect to FIG. 3) based on win reporting responses received from central gaming servers 106 and/or legacy game servers 604. For each central gaming server 106, connection coordinator 902 may be configured to manage a communication connection between central gaming server 106 and wide area game server 904, and may determine whether central gaming server 106 or wide area game server 904 should be used to implement such server-side functions (e.g., ball calls and/or win evaluation). For example, central gaming server may be 106 may be used by default, but may defer to wide area game server 904 when connection coordinator 902 determines a valid connection is established between central gaming server 106 and wide area game server 904.

Figure 10:
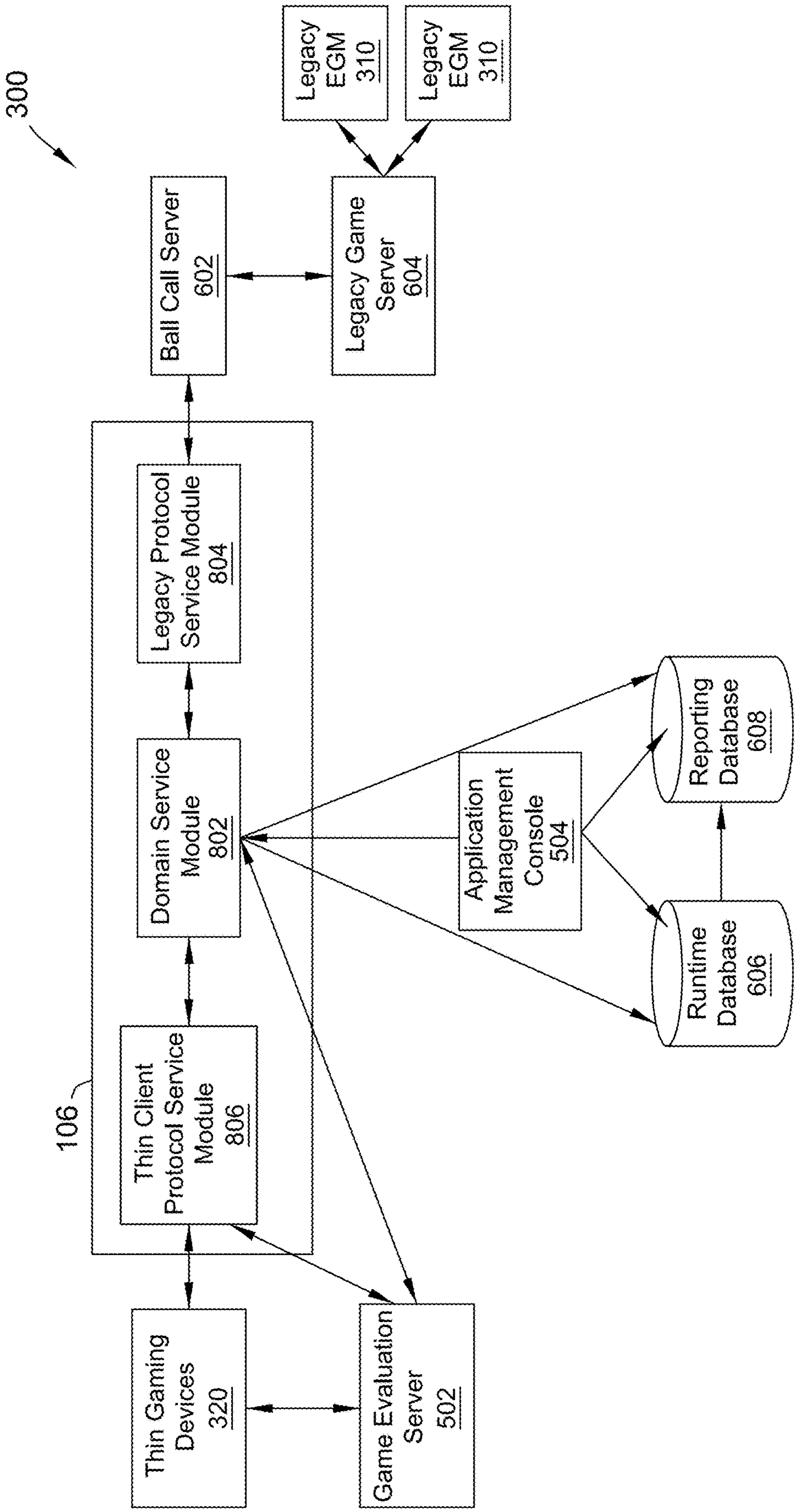
FIG. 10 is a block diagram illustrating another example embodiment of the gaming system shown in FIGS. 3, 5, 6, 7, 8, and 9.

FIG. 10 is a block diagram illustrating another example embodiment of gaming system 300 shown in FIG. 3, in which gaming system 300 further includes ball call server 602 and legacy game server 604. Ball call server 602 may provide ball call 302 to domain service module 802 via legacy protocol service module 804 and to legacy EGMs 310 via legacy game server 604, based on which domain service module 802 and legacy EGMs 310 may evaluate respective bingo cards. Legacy protocol service module 804 may perform any necessary protocol translation, so that existing legacy EGMs 310, legacy game server 604, and/or ball call server 602 may be integrated into gaming system 300 (e.g., by being enabled to communicate with central gaming server 106) without a need for reconfiguring and/or updating legacy EGMs 310, legacy game server 604, and/or ball call server 602. In other words, from the perspective of ball call server 602, central gaming server 106 may "appear" to be similar to legacy game server 604, because legacy protocol service module 804 may communicate with ball call server 602 using protocols similar to those used by legacy game server 604. In some embodiments, central gaming server 106 and/or legacy game server 604 may be located at a same site and/or at different (e.g., remote) sites.

Figure 11:
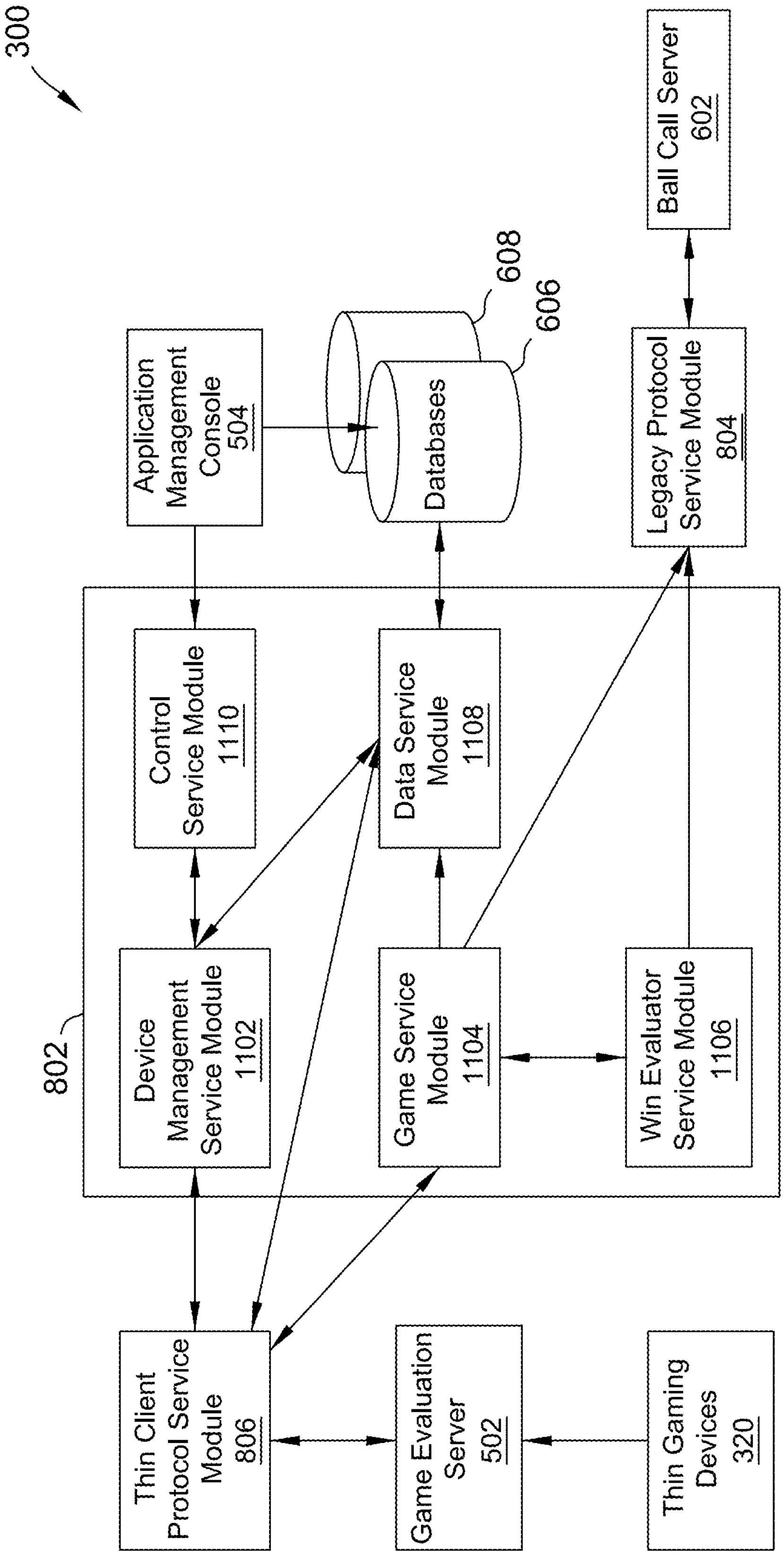
FIG. 11 is a block diagram illustrating another example embodiment of the gaming system shown in FIGS. 3, 5, 6, 7, 8, 9, and 10.

FIG. 11 is a block diagram illustrating another example embodiment of gaming system 300 shown in FIG. 3, further illustrating additional detail of domain service module 802. Domain service module 802 may include a device management service module 1102, a game service module 1104, a win evaluator service module 1106, a data service module 1108, and/or a control service module 1110. Device management service module 1102 may be coupled to thin client protocol service module 806 and configured to handle EGM configuration and EGM control requests. Game service module 1104 may be coupled to client protocol service module 806 and configured to execute gameplay functions based on a specified EGM configuration for thin gaming devices 320. Win evaluator service module 1106 may be configured to evaluate win outcomes (e.g., based on a ball call 302 received from ball call server 602 via legacy protocol service module 804, one or more bingo cards, and one or more pay tables). Data service module 1108 may be configured to handle accessing and/or storing data, for example, in runtime database 606 and/or reporting database 608. Control service module 1110 may be configured to control domain service module 802 based on requests received through application management console 504 (e.g., to change configuration and/or to provide certain data) and to generate responses to such requests.

Figure 12:
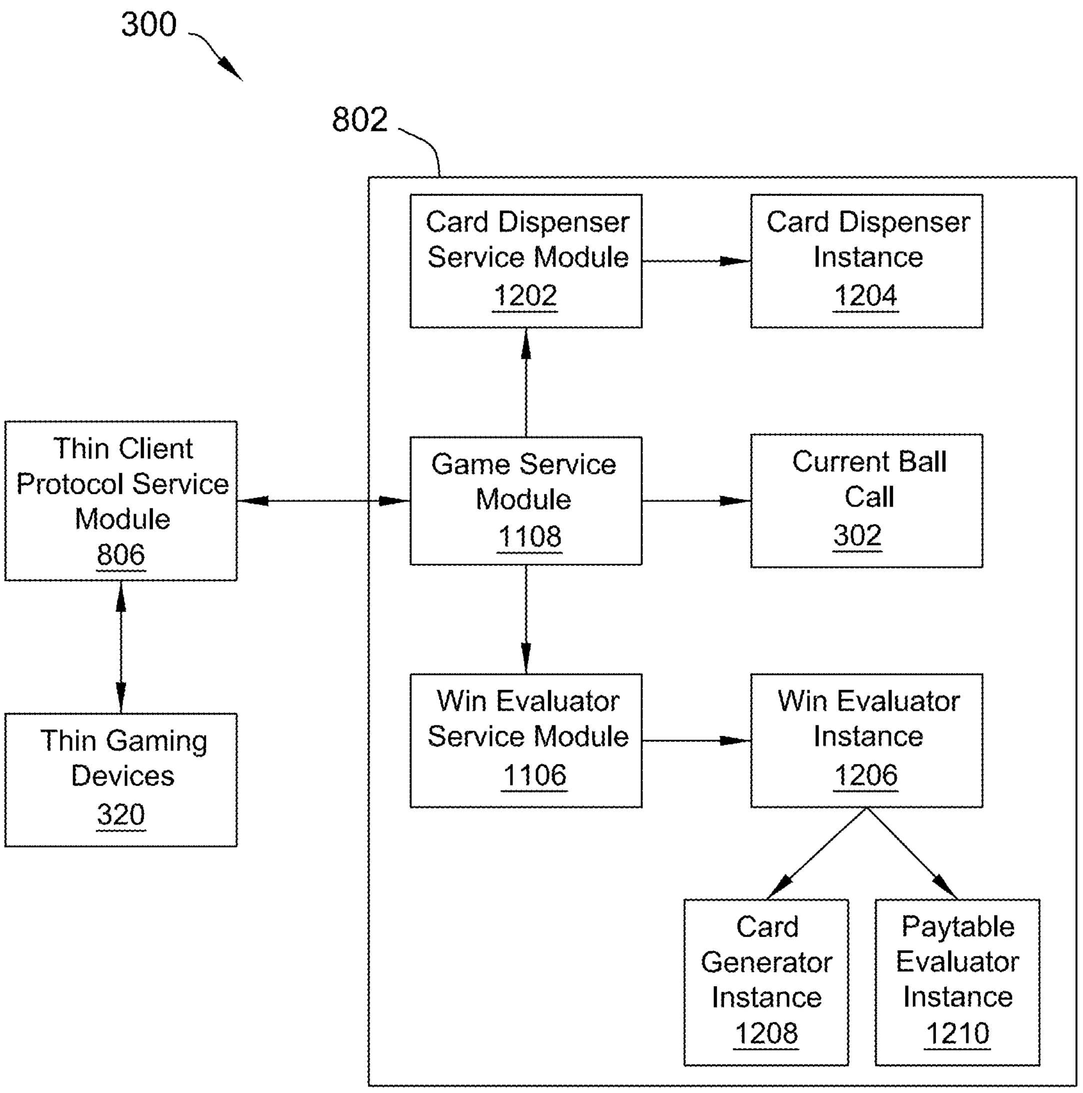
FIG. 12 is a block diagram illustrating another example embodiment of the gaming system shown in FIGS. 3, 5, 6, 7, 8, 9, 10, and 11.

FIG. 12 is a block diagram illustrating another example embodiment of gaming system 300 shown in FIG. 3, further illustrating additional detail of domain service module 802. Domain service module 802 may further include a card dispenser service module 1202, which, for a card dispenser instance 1204, may generate and/or select one or more bingo cards for use in evaluating a particular bingo game instance for each thin gaming device 320 that has requested a game outcome from domain service module 802 via thin client protocol service module 806. Win evaluator service module 1106, for each win evaluator instance 1206, may utilize a card generator instance 1208 and a pay table evaluator instance 1210 to determine if a winning combination has occurred based on a ball call 302, a bingo card, and a pay table, as described with respect to FIG. 3. Based on this determination, a game outcome and other associated data (e.g., instructions to present a certain facade) may be transmitted by domain service module 802 to thin gaming devices 320 via thin client protocol service module 806.

Figure 13:
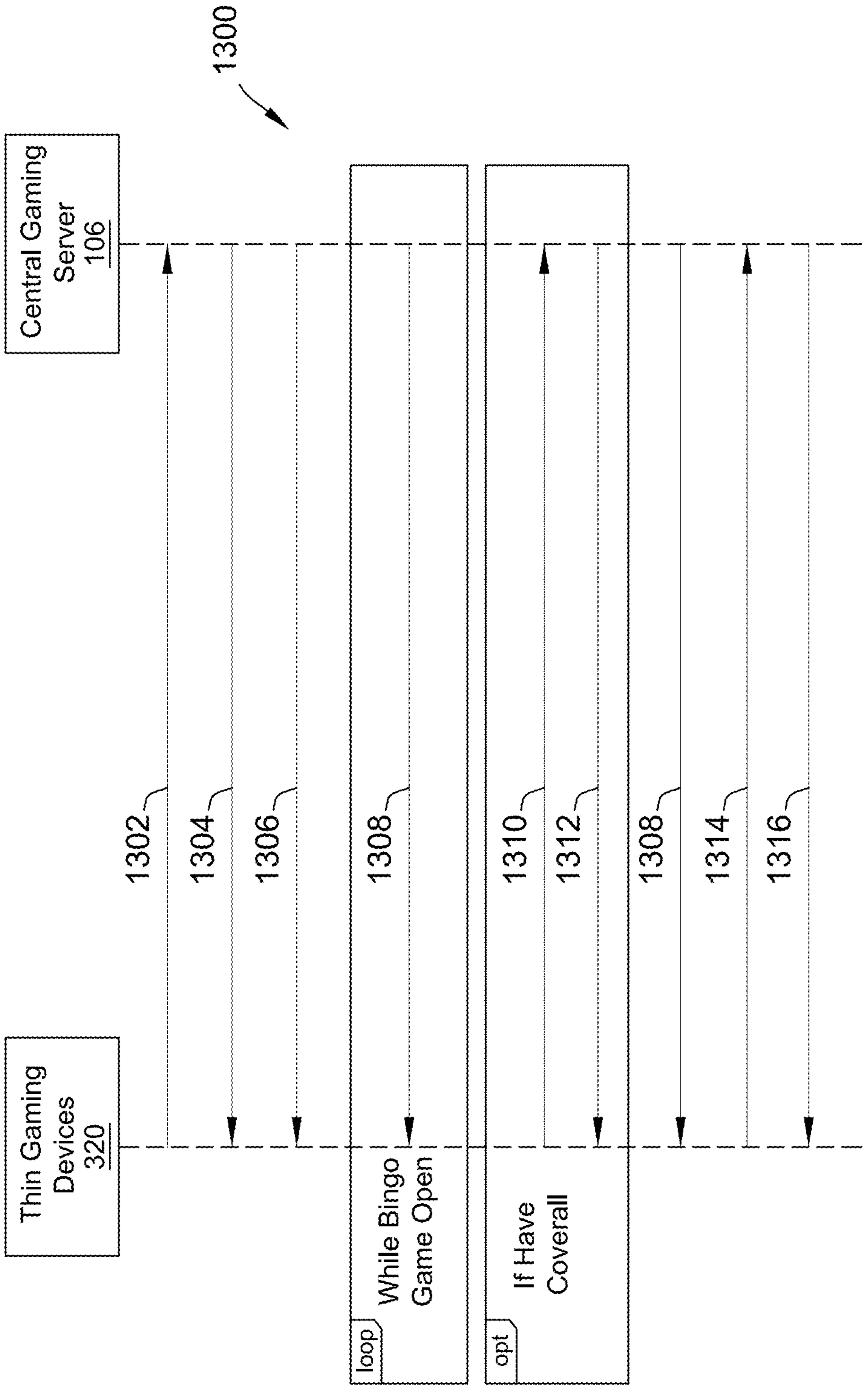
FIG. 13 is a data flow diagram illustrating an example data flow within the gaming system shown in FIGS. 3, 5, 6, 7, 8, 9, 10, and 11 in accordance with various embodiments described herein.

FIG. 13 is a data flow diagram 1300 illustrating a transmission of data between thin gaming device 320 and central gaming server 106 during an example bingo game. Thin gaming device 320 may transmit a gameplay request message 1302 to central gaming server 106, for example, in response to player 506 initiating gameplay at thin gaming device 320. In response to receiving gameplay request message 1302 and after performing an initial gameplay evaluation (e.g., evaluating a bingo card associated with thin gaming device 320 based on an initial forty ball calls 302), central gaming server may transmit a first card only gameplay response message 1304 and a first full outcome gameplay response message 1306 (which may be similar to outcome results message 326 described with respect to FIG.

3), which may include the bingo card daubed with respect to the initial (e.g., forty) ball calls 302 and any award associated with the initial evaluation. In some embodiments, first card only gameplay response message 1304 may be received before first full outcome gameplay response message 1306, with some intervening period. Alternatively, first card only gameplay response message 1304 and first full outcome gameplay response message 1306 may be received substantially simultaneously. As described in further detail below with respect to FIG. 16, thin gaming device may display the blank bingo card, the daubed bingo card, and a reel sequence in response to receiving first card only gameplay response message 1304 and/or first full outcome gameplay response message 1306.

After first card only gameplay response message 1304 and a first full outcome gameplay response message 1306 and evaluations are performed by central gaming server 106 based on additional ball calls 302, additional gameplay response messages 1308 may be transmitted to thin gaming device 320 from central gaming server including updated daubed bingo cards and/or awards. If one of the additional gameplay response messages 1308 indicates a game ending win may be associated with thin gaming device 320 (e.g., the bingo card associated with thin gaming device 320 is completely filled), thin gaming device 320 may send a claim win request message 1310 to central gaming server, based on which central gaming server 106 may determine thin gaming device 320 has achieved a game ending win (e.g., if no other claim win request messages 1310 have been received yet from other gaming devices). If a game ending win has been achieved, central gaming server 106 may transmit a claim win response message 1312 to thin gaming device 320. On the other hand, if one of the additional gameplay response messages 1308 indicates the game is complete and no game ending win is associated with thin gaming device 320 (e.g., because another device has achieved the game ending win), thin gaming device 320 may send a report gaming outcome message 1314 (e.g., indicating that the game outcome was presented to player 506 and any earned prize has been awarded). In response to receiving the report gaming outcome message 1314, central gaming server 106 may transmit a game outcome acknowledgement messages 1316 indicating the game outcome report gaming outcome message 1314 has been received.

Figure 14:
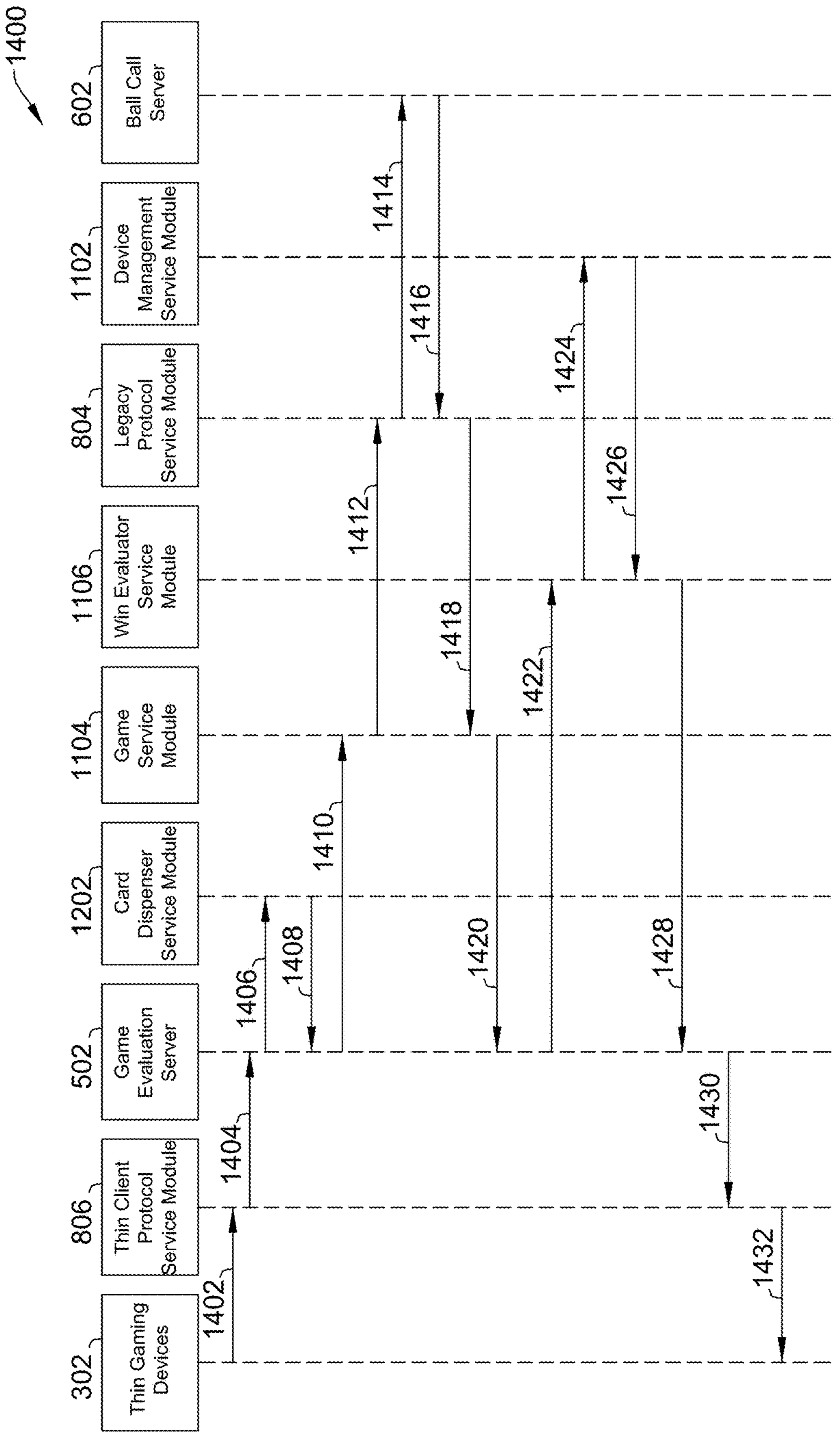
FIG. 14 is a data flow diagram illustrating another example data flow within the gaming system shown in FIGS. 3, 5, 6, 7, 8, 9, 10, and 11 in accordance with various embodiments described herein.

FIG. 14 is a data flow diagram 1400 illustrating a transmission of data between thin gaming device 320, thin client protocol service module 806, game evaluation server 502, card dispenser service module 1202, game service module 1104, win evaluator service module 1106, legacy protocol service module 804, device management service module 1102, and ball call server 602 during an example bingo game.

Thin gaming device 320 may generate and transmit an external gameplay request message 1402 to thin client protocol service module 806, for example, in response to player 506 initiating gameplay at thin gaming device 320. In response, thin client protocol service module 806 may generate and transmit a first internal gameplay request message 1404 to game evaluation server 502. External gameplay request message 1402 and first internal gameplay request message 1404 may be generated according to different communication protocols, and thin client protocol service module 806 may be configured to translate between the different protocols.

In response to receiving first internal gameplay request message 1404, game evaluation server may generate and transmit a card request message 1406 to card dispenser service module 1202, in response to which card dispenser service module 1202 may transmit one or more card serial numbers 1408 to game evaluation server 502. Card serial numbers 1408 may represent, or include data representing, bingo cards, and game evaluation server 502 may retrieve, select, and/or generate the bingo cards represented by card serial numbers 1408 for use in a gameplay evaluation.

Game evaluation server 502 may further generate and transmit a second internal gameplay request message 1410 to game service module 1104. Second internal gameplay request message 1410 may, in some embodiments, be generated according to the same communication protocol as first internal gameplay request message 1404, such that game evaluation server 502 may merely retransmit at least a portion of first internal gameplay request message 1404 to game service module 1104 upon receiving first internal gameplay request message 1404. In response to receiving second internal gameplay request message 1410, game service module 1104 may transmit a first ball call request message 1412 to legacy protocol service module 804, which may in turn generate and transmit a second ball call request message 1414 to ball call server 602. First ball call request message 1412 and second ball call request message 1414 may be generated according to different communication protocols (e.g., second ball call request message 1414 may use a legacy protocol), and thin client protocol service module 806 may be configured to translate between the different protocols.

In response to receiving second ball call request message 1414, ball call server 602 may generate and transmit a first ball call message 1416 to legacy protocol service module 804, which in turn may generate and transmit a second ball call message 1418. First ball call message 1416 and second ball call message 1418 may be generated according to different communication protocols (e.g., first ball call message 1416 may use a legacy protocol), and thin client protocol service module 806 may be configured to translate between the different protocols. First ball call message 1416 and second ball call message 1418 may include data representing ball call 302. Game service module 1104 may generate and transmit a first internal gameplay response message 1420 including the data representing ball call 302 to game evaluation server 502 for use, along with the bingo cards, in a gameplay evaluation.

Game evaluation server 502 may further generate and transmit a win evaluation request message 1422 to win evaluator service module 1106. The evaluation request message 1422 may include, or include data representing, the bingo cards and ball call 302, which win evaluator service module 1106 may use, in conjunction with one or more pay tables, for evaluating whether any winning conditions have occurred. In some embodiments, win evaluator service module may generate and transmit an EGM configuration request message 1424 to device management service module 1102 and receive an EGM configuration response message 1426 generated by device management service module 1102 and including configuration data associated with thin gaming device 320. In such embodiments, this configuration data may be used in evaluating whether a win has been achieved. For example, win evaluator service module 1106 may select the one or more pay tables for evaluating the bingo card with respect to ball call 302 based on the configuration of thin gaming device 320. In other words, different thin gaming devices 320 within gaming system 300 may have different configurations, based on which different pay tables may be used for evaluating whether a win has occurred for each thin gaming device 320.

Based on this evaluation, win evaluator service module may transmit a win evaluation response message 1428 to game evaluation server including data representing whether a win has occurred. Based on win evaluation response message 1428, game evaluation server 502 may generate and transmit a second internal gameplay response message 1430 to thin client protocol service module 806, which may in turn generate and transmit an external gameplay response message 1432 to thin gaming device 320. Second internal gameplay response message 1430 and external gameplay response message 1432 may be generated according to different communication protocols, and thin client protocol service module 806 may be configured to translate between the different protocols. Second internal gameplay response message 1430 and external gameplay response message 1432 may include data associated with the win evaluation (e.g., ball call 302, daubed bingo cards, any prizes won, facade data), any of which may be displayed by thin gaming device as described with respect to FIG. 3.

Figure 15:
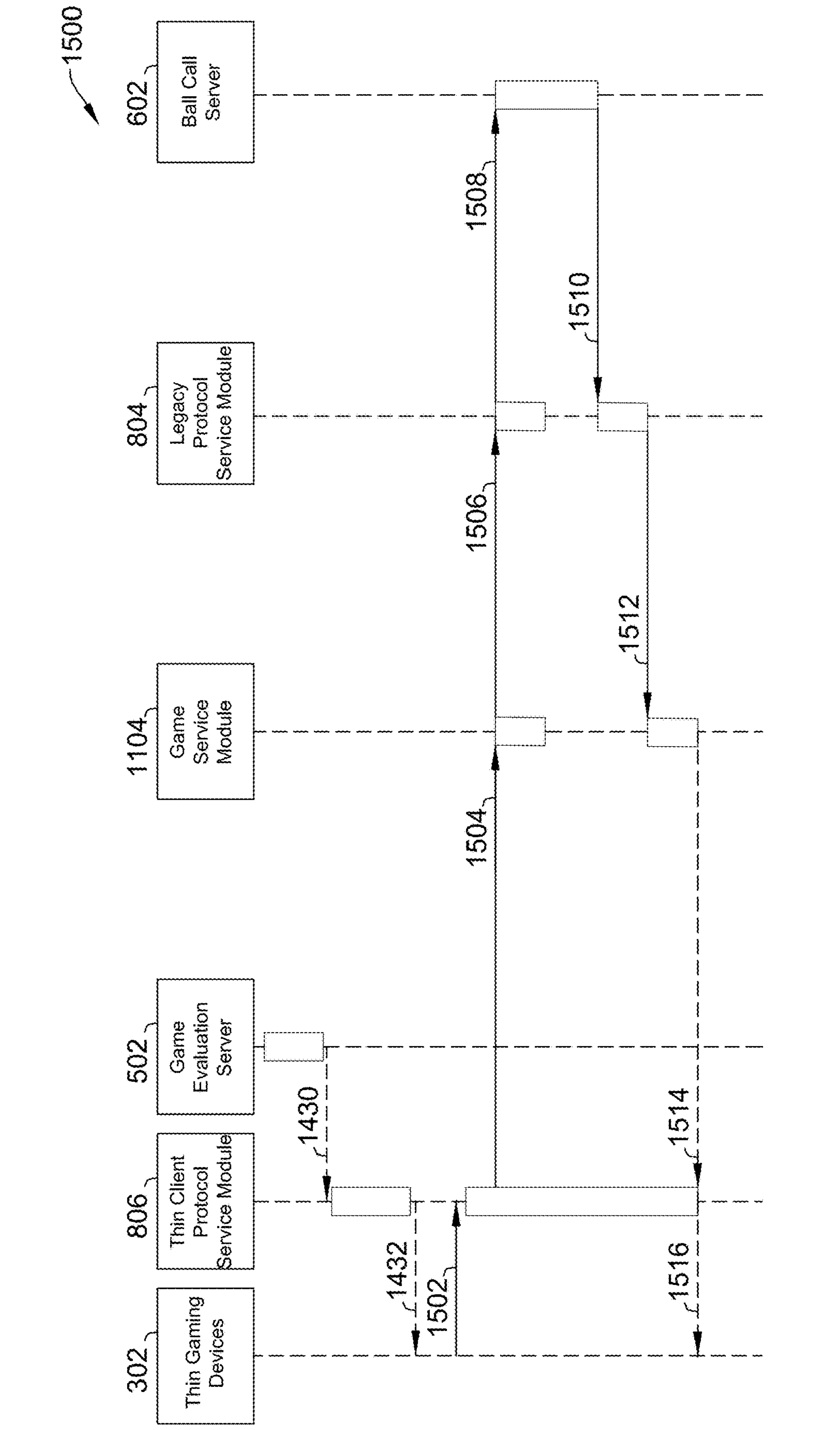
FIG. 15 is a data flow diagram illustrating another example data flow within the gaming system shown in FIGS. 3, 5, 6, 7, 8, 9, 10, and 11 in accordance with various embodiments described herein.

FIG. 15 is a data flow diagram 1500 illustrating a transmission of data between thin gaming devices 320, thin client protocol service module 806, game evaluation server 502, game service module 1104, legacy protocol service module 804, and ball call server 602 during an example bingo game. The data flow diagram 1500 may be a continuation of data flow diagram 1400 shown in FIG. 4.

In response to receiving external gameplay response message 1432, as described with respect to FIG. 4, thin gaming device 320 may generate and transmit an external claim win request message 1502 to thin client protocol service module 806, which may in turn may generate and transmit a first internal claim win request message 1504 to game service module 1104. External claim win request message 1502 and first internal claim win request message 1504 may be generated according to different communication protocols, and thin client protocol service module 802 may be configured to translate between the different protocols. External claim win request message 1502 and first internal claim win request message 1504 may indicate that thin gaming device 320 has received external gameplay response message 1432 indicative of a game ending win and is attempting to claim the game ending win (e.g., before another thin gaming device 320 or legacy EGM 310 claims the game ending win.

In response to receiving first internal claim win request message 1504, game service module 1104 may transmit a second internal claim win request message 1506 to legacy protocol service module 804. In some embodiments, game service module 1104 may repeatedly transmit second internal claim win request message 1506 until a response is received from legacy protocol service module 804 and/or another condition occurs (e.g., a predefined time period expiring). In response to receiving second internal claim win request message 1506, legacy protocol service module 804 may generate and transmit a game ending pattern report message 1508 to ball call server 602, which may determine, based on game ending pattern report message 1508, whether a valid game ending win has occurred. Game ending pattern report message 1508 may be generated according to a legacy protocol, and may be similar to report messages generated by, for example, legacy EGMs 310 and/or legacy game server 610. Based on the determination, ball call server 602 may generate and transmit game ending win confirmation message 1510 to legacy protocol service module 804, which in turn may generate and transmit a first internal claim win reply message 1512 to game service module 1104. In response, game service module 1104 may generate and transmit a second internal claim win response message 1514 to thin client protocol service module 806, which may in turn generate and transmit an external claim win response message 1516 to thin gaming device 320. Second internal claim win response message 1514 and external claim win response message 1516 may be generated according to different communication protocols, and thin client protocol service module 802 may be configured to translate between the different protocols. In response to receiving external claim win response message 1516, thin gaming device 320 may credit any prize associated with the game ending win to a player credit balance associated with player 506.

Figure 16:
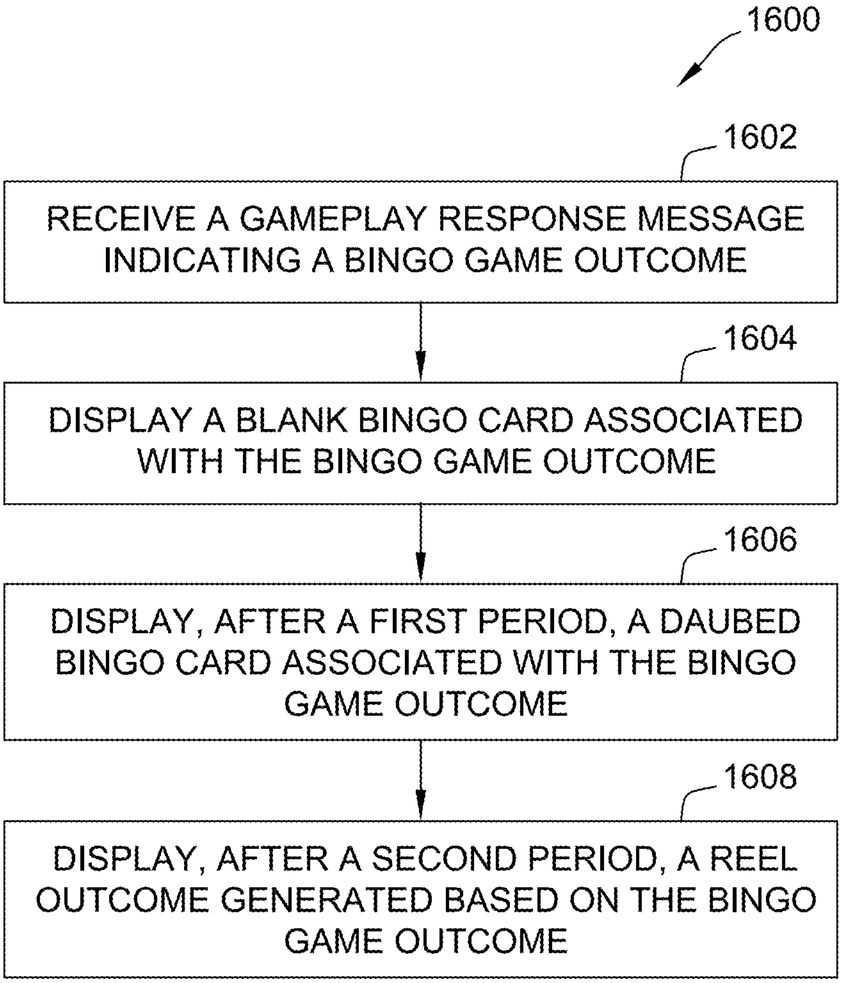
FIG. 16 is a flowchart illustrating an example method for displaying a bingo game outcome at a thin gaming device in accordance with various embodiments described herein.

FIG. 16 is a flow chart illustrating an example method 1600 for displaying a bingo game outcome on thin gaming device 320. Method 1600 may include receiving 1602 a gameplay response message (e.g., external gameplay response message 1434) indicating a bingo game outcome. Method 1600 may further include displaying 1604 a blank bingo card associated with the bingo game outcome. Method 1600 may further include displaying 1606, after a first period, a daubed bingo card (e.g., the blank bingo card with indicators as to bingo card positions daubed based on ball call 302) associated with the bingo game outcome. Method 1600 may further include displaying 1608, after a second period, a reel outcome (e.g., using reels 130) generated based on the bingo game outcome (e.g., according to a facade determined by central gaming server 106).

In some embodiments, one or more of the blank bingo card, the daubed bingo card, and/or instructions to present the reel outcome may be received by thin gaming device 320 simultaneously. In such embodiments, the first period (i.e., the period between displaying the blank bingo card and the daubed bingo card) and the second period (i.e., the period between displaying the daubed bingo card and displaying the reel outcome) may be predefined and implemented by thin gaming device 320 according to a timer. By adding a time delay before the displaying of the blank bingo card, the daubed bingo card, and the reel outcome, the bingo game presented by thin gaming device 320 may more closely replicate the bingo game experience provided by legacy EGMs 310, in which the blank bingo card, the daubed bingo card, and the reel outcome are displayed in real time.

Alternatively, in some embodiments, one or more of the blank bingo card, the daubed bingo card, and/or instructions to present the reel outcome may be received by thin gaming device 320 at different times. For example, the blank bingo card may be transmitted by central gaming server 106 and received by thin gaming device 320 first, the daubed bingo card may be transmitted by central gaming server 106 and received by thin gaming device 320 second, and the instructions present the reel outcome may be transmitted by central gaming server 106 and received by thin gaming device 320 third. Accordingly, in such embodiments, the time delay may be at least partially implemented at central gaming server 106 rather than thin gaming device 320. In such embodiments, one or more of the blank bingo card, daubed bingo card, and reel outcome may be displayed in real time and/or after a pre-set delay by thin gaming device 320 after being received by thin gaming device 320, and the first period and/or the second period may correspond to a real time delay in receiving blank bingo card, daubed bingo card, and/or the reel outcome from central gaming server 106.

Figure 17:
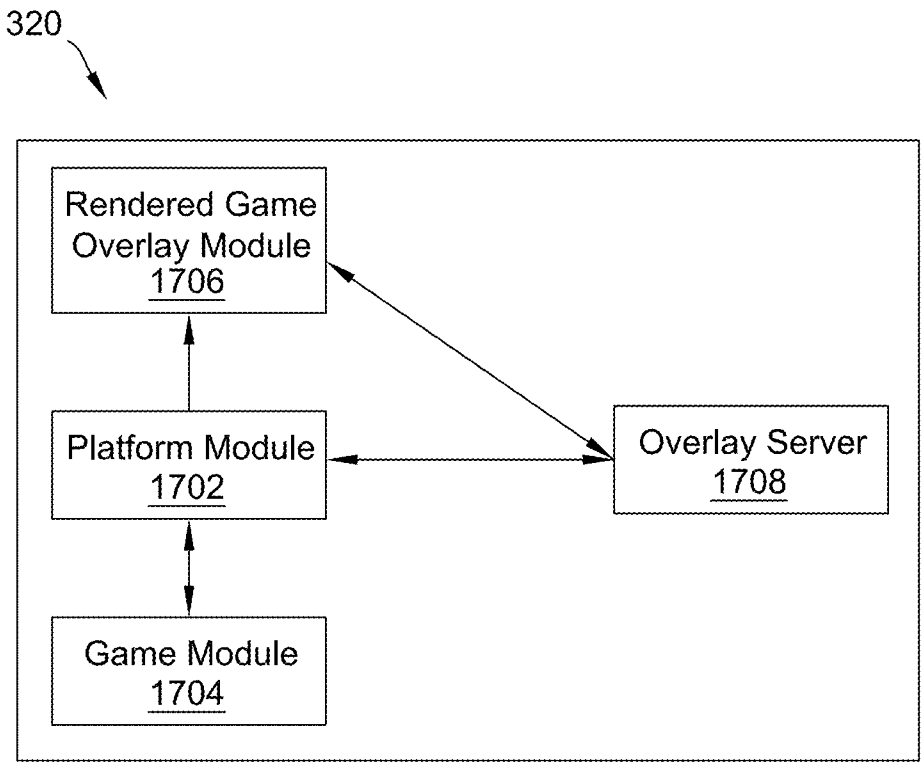
FIG. 17 is a block diagram illustrating an example embodiment of a thin gaming device in accordance with various embodiments described herein.

FIG. 17 is a block diagram illustrating example components of thin gaming device 320 used to render and display an overlay screen in accordance with various embodiments described herein. In the embodiment illustrated in FIG. 17, thin gaming device 320 includes a platform module 1702, a game module 1704, a rendered game overlay module 1706, and an overlay server 1708.

During initialization of a thin gaming device, platform module 1702 may be configured for a type of central gaming server (e.g., a bingo central gaming server). Platform module 1702 is communicatively coupled to central gaming server 106 (shown in FIG. 1) and is configured to transmit and receive messages with central gaming server 106. For example, platform module 1702 may be communicatively coupled to a variety of different "types" of central gaming servers 106, namely servers that serve data for executing different types of games, including, but not limited to, RNG-based games, bingo-based games, bingo-like games (e.g., pull-tab games, lotteries, punch boards, tip jars, and instant bingo, among others) and/or historical horse racing (HHR) type games.

In some embodiments, platform module 1702 tracks the credit balance of a player playing a game on the thin gaming device. For example, platform module 1702 may maintain a credit bank which keeps track of credit transfers. Therefore, when a player is establishing a credit balance and inserts or otherwise submits money, platform module 1702 adds the appropriate credits to the credit bank. When a player places a monetary wager, on one or more outcomes of an instance, or play, of a primary game, sometimes referred to as a base game, platform module 1702 deducts the appropriate credits from the credit bank. Platform module 1702 adds awards from any winning outcomes back to the credit bank which can be provided to the player upon completion of a gaming session or when the player wants to "cash out."

Platform module 1702 is further communicatively coupled to game module 1704 and overlay server 1708. More particularly, platform module 1702 transmits event data to game module 1704 and overlay server 1708. The event data may include at least one game outcome and other associated data (e.g., façade data) generated or determined by central gaming server 106. The at least one game outcome generated by central gaming server 106 may be associated with a Class III game (e.g., RNG outcome) or a Class II game (e.g., bingo outcome), as discussed above. For example, the at least one game outcome may include a bingo outcome (e.g., an outcome of a bingo card evaluation against a bingo ball call) generated by central server 106. In some embodiments, platform module 1702 receives event data from central gaming server 106. For example, central gaming server 106 may generate at least one game outcome and associated data, and may transmit the at least one game outcome and associated data to platform module 1702.

Platform module 1702 may act as an intermediary between game module 1704 and overlay server 1708. For example, game module 1704 may send instructions to platform module 1702 to start attract mode (e.g., a demonstration mode to attract potential players to thin gaming device). Platform module 1702 may then relay these instructions to overlay server 1708 to start attract mode, and overlay server 1708 may format attract mode content and send the attract mode content to rendered game overlay module 1706.

One or more storage mediums (not shown) has stored thereon one or more configuration files. The one or more configuration files may comprise styling data. In some embodiments, the configuration file contains styling data. The styling data may comprise time, size, color, design, and/or location of a rendered overlay. For example, in some embodiments, a rendered game overlay comprises a transparent red overlay which covers the entirety of the screen of the display, thereby giving an appearance of a red screen during a free spin. In yet another example, a rendered game overlay conveys a game status, such as "Waiting for Players" or "Cash Out". In yet another example, a rendered game overlay comprises a credit meter for display of a credit balance (e.g., a credit balance being tracked by platform module 1702). In yet another example, a rendered game overlay comprises a help menu.

Overlay server 1708 is communicatively coupled to platform module 1702. In some embodiments, there is bi-directional communication between overlay server 1708 and platform module 1702. During initialization (e.g., setup) of the thin gaming device, platform module 1702 transmits a configuration message to overlay server 1708, the configuration message specifying a location of one or more configuration files stored on the storage medium. Platform module 1702 may map the configuration file to the overlay server 1708 so that overlay server 1708 can directly read the configuration file from the storage medium. Overlay server 1708 parses the configuration file and generates, based on the configuration file, overlay data and transmits the overlay data to rendered game overlay module 1706 in a relayed application message. The rendered game overlay module renders the overlay data. Overlay server 1708 is configured to receive event data from platform module 1702, as discussed above. The event data received by platform module 1702 is transmitted to overlay server 1708. Overlay server 1708 is configured to parse the event data and send an update message to rendered game overlay module 1706 with the parsed event data. The update message instructs rendered game overlay module 1706 to update the overlay data content.

In some embodiments, overlay server 1708 includes a web server and rendered overlay module 1706 at least partially consists of a web browser and/or application which is presented on top of a game presentation. In such embodiments, application message may specify an overlay address (e.g., a web page) and rendered game overlay module 1706 may be configured to navigate to the overlay address.

Rendered game overlay module 1706 is configured to render the overlay data on a display device of the thin gaming device 320, such as the main display 128 (e.g., video display monitor) of the gaming device 104A (shown in FIG. 1). In some embodiments, the web browser or application is displayed on top of (e.g., overlaid) a presentation (e.g., a façade) of a game being displayed on thin gaming device 320.

In some embodiments, the overlay data is associated with the at least one game outcome. For example, if thin gaming device 320 receives a bingo outcome and associated data from central gaming server 106, rendered game overlay module 1706 may render a blank bingo card, a dispensed bingo card, a non-pattern daubed bingo card, and/or a patterned daubed bingo card associated with the bingo game outcome.

In some embodiments, the configuration file contains styling data. The styling data may include timing information relating to the one or more overlays. For example, the web browser or application renders an overlay of a blank bingo card when overlay server receives a game data message from platform module. Next, the web browser or application renders a dispensed bingo card (e.g., a bingo card with numbers). The web browser or application then renders a non-pattern daubed bingo card (e.g., a daubed bingo card without a winning pattern). In some embodiments, the web browser or application further renders a patterned daubed card (e.g., a daubed bingo card with a winning pattern). In some embodiments, there may be one or more time delays between the renderings of the dispensed bingo card, the non-pattern daubed bingo card, and/or the patterned bingo card. The time delays may be predefined and implemented by a timer. By adding the one or more time delays, the bingo game presented by thin gaming device 320 may more closely replicate the bingo game experience provided by legacy EGMs 310.

Additionally, or alternatively, the styling data comprises size, color, design, location, as discussed above. For example, in some embodiments, a rendered game overlay comprises a transparent red overlay which covers the entirety of the screen of the display, thereby giving an appearance of a red screen during a free spin. In yet another example, a rendered game overlay conveys a game status, such as "Waiting for Players" or "Cash Out". In yet another example, a rendered game overlay may comprise a credit meter for display of a credit balance. In yet another example, a rendered game overlay may also comprise a help menu.

Thin gaming device 320 may further comprise an input/output (I/O) module (not shown). The I/O module may be configured to receive input from a player. In some embodiments, a player may provide an input to change the presentation of the one or more overlays, such as the location of the one or more overlays on the screen. The input is transmitted to platform module 1702 which relays the input to overlay server 1708. Overlay server 1708 relays this information to rendered game overlay module 1706. The rendered game overlay module 1706 then updates a location of the rendering on a display of thin gaming device 320. In embodiments where a rendered overlay is presented on a touch screen display of thin gaming device 320, a player may simply select and drag the overlay to a different location.

Thin gaming device 320 may further comprise a game development kit (GDK) (not shown). The GDK may act as an interface between platform module 1702 and the game module 1704. In some embodiments, the GDK handles all communication between platform module 1702 and game module 1704.

Figure 18:
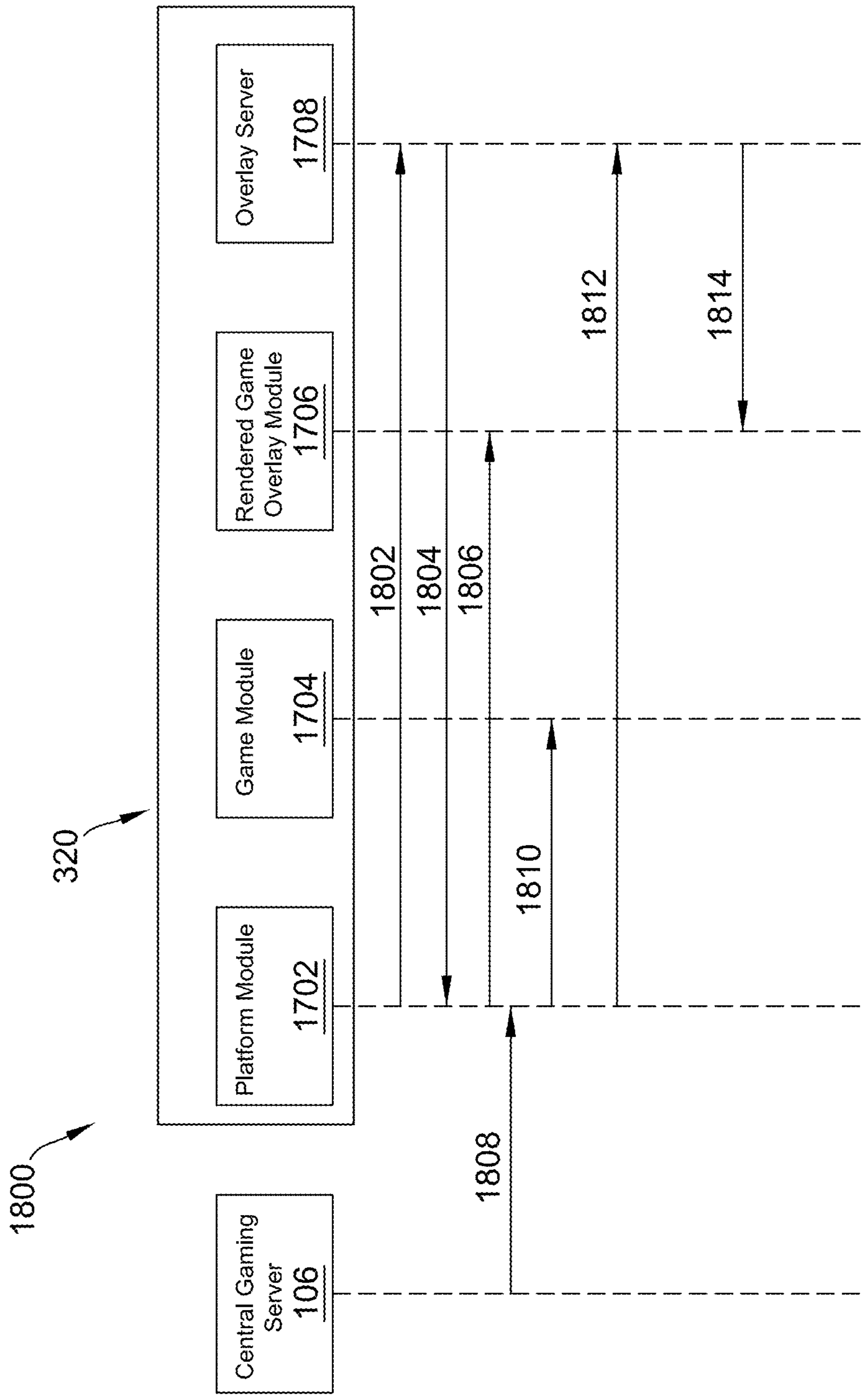
FIG. 18 is a data flow diagram illustrating an example data flow within the thin gaming device shown in FIG. 17 in accordance with various embodiments described herein.

FIG. 18 is a data flow diagram 1800 illustrating a transmission of data between central gaming server 106, platform module 1702, game module 1704, rendered game overlay module 1706, and overlay server 1708 of thin gaming device 320 during a gaming instance, in accordance with various embodiments. Platform module 1702 locates a configuration file stored in a storage medium on thin gaming device 320 and transmits a configuration message 1802 including the location of one or more configuration files to overlay server 1708. In some embodiments, platform module 1702 maps the configuration file to overlay server 1708 and includes this data in configuration message 1802, enabling overlay server 1708 to directly read the configuration file from the storage medium and parse the configuration file.

Overlay server 1708 generates, based on the configuration file, overlay data, and transmits an application message 1804 including an overlay address (e.g., the address of the web page on overlay server module 1708) to platform module 1702. Platform module 1702 transmits a relayed application message 1806 which includes the overlay address (e.g., the address of the web page on overlay server module 1708) to rendered game overlay module 1706. Rendered game overlay module 1706 runs a web browser or application, which is presented on top of a game presentation. In some embodiments, overlay server 1708 includes a web server and rendered overlay module 1706 at least partially consists of a web browser and/or application which is presented on top of a game presentation. In such embodiments, application message may specify an overlay address (e.g., a web page) and rendered game overlay module 1706 may be configured to navigate to the overlay address.

Upon receiving relayed application message 1806, rendered game overlay module 1706 navigates to the overlay address (e.g., a web page) and renders the overlay data. In some embodiments, after platform module 1702 sends the overlay address to rendered game overlay module 1706, overlay server 1708 and rendered game overlay module 1705 may communicate directly with each other. In some embodiments, one or more of configuration message 1802, application message 1804, and/or relayed application message 1806 are transmitted during initialization (e.g., setup) of the thin gaming device.

In the embodiment illustrated in FIG. 18, central gaming server 106 is not part of thin gaming device 320. Central gaming server 106 is configured to generate and determine at least one game outcome and other associated data, as described above. The at least one game outcome may be associated with a Class III game (e.g., an RNG outcome) or a Class II game (e.g., a bingo outcome). Central gaming server 106 then transmits the event data (e.g., at least one game outcome and game information) to platform module 1702 as a gameplay message 1808. In some embodiments, the event data comprises at least one game outcome and game information, the game information comprising the bingo card and the ball call.

In response to receiving a gameplay message 1808, platform module 1702 transmits a game initiation message 1810 to game module 1704. Game initiation message 1810 notifies game module 1704 that thin gaming device 320 has received new event data and includes the at least one outcome. In some embodiments, game initiation message 1810 further includes instructions for the game module 1704. For example, if game module 1704 is in a sleep or other inactive mode, game initiation message 1810 may instruct the game module to wake up.

Platform module 1702 transmits a game data message 1812 to overlay server 1708. Game data message 1812 includes game information data. For example, in some embodiments, game data message 1812 includes the bingo card and the ball call. Overlay server 1708 parses the game information and then transmits an update message 1814 including updated overlay data to rendered game overlay module 1706. Update message 1814 instructs the rendered game overlay module 1706 (e.g., a web browser) to update the overlay data and in response, rendered game overlay module 1706 renders the updated overlay data. In some embodiments, one or more of gameplay message 1808, game initiation message 1810, game data message 1812, and update message 1814 are transmitted for each gaming instance.

In some embodiments, platform module 1702 receives a plurality of gameplay messages 1808 during a gaming instance. For example, if the gaming instance comprises a bingo game, central gaming server 106 may send a gameplay message 1808 to platform module 1702 with an initial game outcome. Upon central gaming server 106 performing additional ball calls, central gaming server 106 will transmit at least one additional gameplay message to platform module 1702. Platform module 1702 will then send updated game information to overlay server 1708 such that the additional ball calls are reflected in the rendered overlays being displayed on thin gaming device 320.

Figure 19:
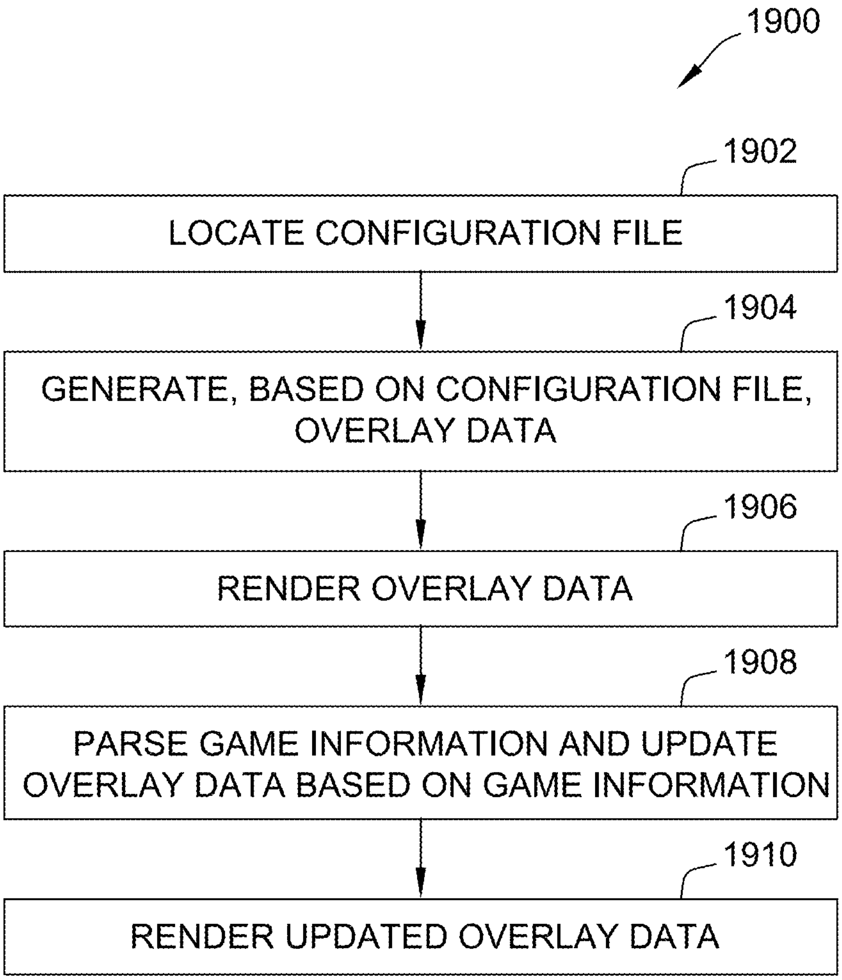
FIG. 19 is a flowchart illustrating an example method for displaying a bingo game outcome at a thin gaming device in accordance with various embodiments described herein.

FIG. 19 is a flowchart illustrating an example method 1900 for displaying an overlay associated with a game outcome at thin gaming device 320 in accordance with various embodiments described herein. Method 1900 comprises locating 1902 a configuration file on a storage medium. In some embodiments, the configuration file is mapped to the overlay server so that the overlay server can directly read the configuration file from the storage medium. Method 1900 further comprises generating 1904, based on the configuration file, overlay data and then rendering 1906 the overlay data. The overlay data may be generated by overlay server 1708 and rendered by rendered game overlay module 1706 running the web browser or application, as discussed above.

Thin client device 320 may receive a gameplay message (e.g., gameplay message 1806 from central gaming server 106). The gameplay message may include at least one game outcome associated with a Class III game (e.g., an RNG outcome) or a Class II game (e.g., a bingo outcome) and associated data (e.g., game information), as described above. The gameplay message may be received by a communication module on thin gaming device 320 (e.g., platform module 1702).

Method 1900 further comprises parsing 1908 the game information. The game information may be parsed by overlay server 1708. The overlay data is then updated based on the parsed game information. Next, method 1900 comprises rendering 1910 the updated overlay data. The game data may be parsed by overlay server 1708 and rendered by the rendered game overlay module 1706 running the web browser or application, as discussed above.

In some embodiments, the configuration file may contain timing information relating to the one or more overlays. For example, the web browser or application renders a first overlay and then, after a predetermined period of time, a second overlay. In some embodiments, the web browser or application renders an overlay of a blank bingo card when overlay server receives a game data message containing bingo game information from platform module 1702. Next, after a period of time has elapsed, the web browser or application renders a dispensed bingo card (e.g., a bingo card with numbers). The web browser or application then renders a non-pattern daubed bingo card (e.g., a daubed bingo card without a winning pattern). In some embodiments, the web browser or application further renders a patterned daubed card (e.g., a daubed bingo card with a winning pattern). In some embodiments, the period between displaying the blank bingo card and the dispensed bingo card may be predefined and implemented according to a timer. By adding a time delay before the displaying of the blank bingo card and the dispensed bingo card, the bingo game presented by thin gaming device 320 may more closely replicate the bingo game experience provided by legacy EGMs 310, in which the blank bingo card, the dispensed bingo card, etc. are displayed in real time.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g., an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A thin gaming device comprising:

a display;

at least one storage medium storing one or more configuration files at the thin gaming device;

an overlay server instantiated on the thin gaming device from data stored within the at least one storage medium of the thin gaming device, the overlay server comprising an embedded web server instantiated on the thin gaming device, the overlay server: i) parses the one or more configuration files, ii) generates, based on the one or more configuration files, initial overlay data, the initial overlay data associated with one or more overlays for a game, and iii) transmits a message including an overlay address;

a rendered game overlay module instantiated on the thin gaming device from data stored within the at least one storage medium, wherein the rendered game overlay module navigates to the overlay address and renders the initial overlay data generated by the overlay server based on the overlay address, the rendered game overlay module further causing to be displayed, on top of a game presentation on the display, the rendering of the initial overlay data; and a platform module in communication with a central server external to the thin gaming device, the platform module being instantiated on the thin gaming device from data stored within the at least one storage medium, wherein the platform module receives game information data from the central server and the rendered game overlay module renders updated overlay data based on the received game information data.

2. The thin gaming device of claim 1 wherein the overlay server is configured to receive the game information data from the platform module, parse the game information data, and send an update message to the rendered game overlay module instructing the rendered game overlay module to update the rendered initial overlay data based on the parsed game information data.

3. The thin gaming device of claim 1, wherein the one or more configuration files comprises styling data related to at least one of a location, timing, color and design of the initial overlay data, wherein rendering the initial overlay data includes causing display of a first facade for a first game type on the display, and wherein the rendered game overlay module is configured to render additional initial overlay data that includes causing display of a second facade for a second game type.

4. The thin gaming device of claim 3, wherein the styling data comprises a time delay before updating the rendered initial overlay data.

5. The thin gaming device of claim 1, wherein the updated overlay data is associated with at least one game outcome.

6. The thin gaming device of claim 5, wherein the at least one game outcome comprises a bingo outcome, a lottery outcome, an RNG outcome, or a historical horse racing (HHR) outcome.

7. The thin gaming device of claim 5, wherein the at least one game outcome is a bingo outcome associated with a current ball call included in the game information data received from the central server, wherein the one or more overlays comprise one or more of a blank bingo card, a dispensed bingo card, a non-pattern daubed bingo card, and a pattern daubed bingo card associated with the bingo game outcome, and wherein the central server is in communication with a thick gaming device and transmits a ball call message identifying the current ball call to the thick gaming device to enable the thin gaming device and the thick gaming device to participate in a same communal bingo game.

8. The thin gaming device of claim 1, wherein the rendered game overlay module is further configured to update a location of the one or more overlays on the display based on a player input.

9. The thin gaming device of claim 1, wherein the rendered game overlay module runs a web browser.

10. A method implemented by a thin gaming device comprising a display, at least one storage medium, an overlay server instantiated on the thin gaming device from data stored within the at least one storage medium of the thin gaming device, the overlay server including an embedded web server instantiated on the thin gaming device, the thin gaming device further comprising a rendered game overlay module instantiated on the thin gaming device from data stored within the at least one storage medium, and a platform module instantiated on the thin gaming device from data stored within the at least one storage medium, the method for displaying an overlay on the thin gaming device, the method comprising:

the overlay server: i) parsing one or more configuration files stored in the at least one storage medium, ii) generating initial overlay data based on the one or more configuration files, the initial overlay data associated with one or more overlays for a game, and iii) transmitting a message including an overlay address;

the rendered game overlay module navigating to the overlay address and rendering the overlay data generated by the overlay server based on the overlay address, the rendered game overlay module causing to be displayed, on top of a game presentation on the display, the rendering of the initial overlay data; and the platform module receiving game information data from a central server external to the thin gaming device and the rendered game overlay module rendering updated overlay data based on the received game information data.

11. The method of claim 10 further comprising the overlay server receiving game information data from the platform module, parsing the game information data, and transmitting an update message to the rendered game overlay module instructing the rendered game overlay module to update the rendered initial overlay data based on the parsed game information data.

12. The method of claim 10, wherein the configuration file comprises styling data related to at least one of a location, timing, color and design of the initial overlay data.

13. The method of claim 12, wherein the styling data comprises a time delay before updating the rendered initial overlay data.

14. The method of claim 10, wherein the updated overlay data is associated with at least one game outcome.

15. The method of claim 14, wherein the at least one game outcome comprises a bingo outcome, a lottery outcome, an RNG outcome, or a historical horse racing (HHR) outcome.

16. The method of claim 14, wherein the at least one game outcome is a bingo outcome, and the one or more overlays comprise one or more of a blank bingo card, a dispensed bingo card, a non-pattern daubed bingo card, and a pattern daubed bingo card associated with the bingo game outcome.

17. The method of claim 10, wherein the rendered game overlay module is further configured to update a location of the one or more overlays on the display based on a player input.

18. The method of claim 10, wherein the rendered game overlay module runs a web browser.

19. At least one non-transitory computer-readable storage media having computer-executable instructions embodied thereon, wherein when executed by at least one processor of a thin gaming device including an embedded web server instantiated on the thin gaming device from data stored within the at least one non-transitory computer-readable storage media, the computer-executable instructions cause the at least one processor to:

parse one or more configuration files stored on the at least one non-transitory computer-readable storage media;

generate, based on the one or more configuration files, initial overlay data, the initial overlay data associated with one or more overlays for a game;

transmit a message including an overlay address;

navigate to the overlay address;

render the initial overlay data based on the overlay address and cause to be displayed, on top of a game presentation on the display, the rendering of the initial overlay data;

receive game information data from a central server external to the thin gaming device; and render updated overlay data based on the received game information data.

* * * * *